(12) United States Patent
Niess et al.

(10) Patent No.: US 11,700,223 B2
(45) Date of Patent: Jul. 11, 2023

(54) ASYNCHRONOUS COLLABORATION IN A COMMUNICATION PLATFORM

(71) Applicant: Salesforce, Inc., San Francisco, CA (US)

(72) Inventors: Anna Niess, Hastings-on-Hudson, NY (US); Noah Weiss, New York, NY (US); Kevin Marshall, San Francisco, CA (US); John Rodgers, Vancouver (CA); Patrick Kane, Vancouver (CA); Prajna Shetty, San Francisco, CA (US); Michael Hahn, San Francisco, CA (US); Alfred Xing, Vancouver (CA); Justin Rushing, Oakland, CA (US); Julie Haynes, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/320,620

(22) Filed: May 14, 2021

(65) Prior Publication Data
US 2022/0368660 A1 Nov. 17, 2022

(51) Int. Cl.
*H04L 51/216* (2022.01)
*H04L 51/18* (2022.01)
*H04L 51/046* (2022.01)

(52) U.S. Cl.
CPC .......... *H04L 51/216* (2022.05); *H04L 51/046* (2013.01); *H04L 51/18* (2013.01)

(58) Field of Classification Search
CPC ....... H04L 51/16; H04L 51/046; H04L 51/18; H04L 67/10; H04L 63/126; H04L 63/20;
(Continued)

(56) References Cited

U.S. PATENT DOCUMENTS 6,119,147 A * 9/2000 Toomey .............. H04L 12/1831
719/329
11,061,547 B1 * 7/2021 Fieldman ............ G06F 3/04847
(Continued)

OTHER PUBLICATIONS

U.S. Appl. No. 16/993,859, filed Aug. 14, 2020, Butterfield, et al., "Electronic Board Associated With a Communication Platform", 45 pages.
(Continued)

*Primary Examiner* — Ninos Donabed
(74) *Attorney, Agent, or Firm* — Lee & Hayes, P.C.

(57) ABSTRACT

Asynchronous collaboration via a communication platform is described. A message representative of an asynchronous meeting can be displayed via a user interface of a communication platform. The user interface can include an affordance to enable a user to add a snippet of content to the asynchronous meeting. In response to detecting an actuation of the affordance, an input user interface that includes an option to record or upload the snippet of content can be displayed. The snippet of content can be received from a client of a user associated with the asynchronous meeting and can be associated with other snippet(s) of content added by other user(s) associated with the asynchronous meeting. A preview summary of snippet(s) of content associated with the asynchronous meeting can be displayed in association with the message, wherein each snippet of content is viewable via a thread associated with the message.

20 Claims, 13 Drawing Sheets

(58) Field of Classification Search
CPC ..... H04L 67/306; H04L 67/22; G06F 16/951; G06F 16/285; G06F 16/958; G06F 16/24578; G06F 16/337; G06F 16/9535; G06Q 30/02; G09B 5/12
See application file for complete search history.

(56) References Cited

U.S. PATENT DOCUMENTS

| | | | |
|---|---|---|---|
| 11,265,183 B1* | 3/2022 | Iyer | H04L 12/1831 |
| 2002/0160350 A1* | 10/2002 | Tanaka | G09B 5/08 434/350 |
| 2004/0143603 A1* | 7/2004 | Kaufmann | G09B 5/08 |
| 2004/0143630 A1* | 7/2004 | Kaufmann | G09B 7/02 709/224 |
| 2004/0153504 A1* | 8/2004 | Hutchinson | G06Q 10/10 709/204 |
| 2004/0174392 A1* | 9/2004 | Bjoernsen | G06Q 10/10 715/751 |
| 2005/0114475 A1* | 5/2005 | Chang | H04L 67/63 709/220 |
| 2005/0204297 A1* | 9/2005 | Banatwala | G06Q 10/10 715/752 |
| 2006/0053380 A1* | 3/2006 | Spataro | G06Q 10/10 709/204 |
| 2006/0080432 A1* | 4/2006 | Spataro | H04L 12/1831 709/224 |
| 2008/0263010 A1* | 10/2008 | Roychoudhuri | H04N 21/25808 348/E7.083 |
| 2009/0150784 A1* | 6/2009 | Denney | G11B 27/34 715/722 |
| 2010/0070503 A1* | 3/2010 | Abraham | G06Q 30/00 707/E17.001 |
| 2013/0080224 A1* | 3/2013 | O'Brien | G06Q 10/10 705/14.14 |
| 2013/0262410 A1 | 10/2013 | Liu et al. | |
| 2015/0100503 A1* | 4/2015 | Lobo | G06Q 10/103 705/301 |
| 2015/0248222 A1 | 9/2015 | Stickler et al. | |
| 2016/0277341 A1* | 9/2016 | Garen | G06F 3/0481 |
| 2017/0142055 A1 | 5/2017 | Martinazzi et al. | |
| 2017/0249580 A1* | 8/2017 | Newman | G06Q 10/1095 |
| 2017/0371527 A1 | 12/2017 | Morichere-Matte et al. | |
| 2018/0121849 A1 | 5/2018 | Torres et al. | |
| 2018/0287982 A1 | 10/2018 | Draeger et al. | |
| 2018/0302233 A1 | 10/2018 | Viera et al. | |
| 2018/0373415 A1 | 12/2018 | Dellinger et al. | |
| 2020/0234243 A1 | 7/2020 | Miron et al. | |
| 2020/0296147 A1 | 9/2020 | Eliason et al. | |
| 2021/0133681 A1 | 5/2021 | Dhaliwal et al. | |
| 2021/0306384 A1* | 9/2021 | Koura | H04L 65/1086 |
| 2021/0306390 A1* | 9/2021 | Iwasaki | H04M 3/42382 |
| 2022/0109650 A1 | 4/2022 | Weiss et al. | |

OTHER PUBLICATIONS

U.S. Appl. No. 17/064,161, filed Oct. 6, 2020, Weiss, et al., "Snippet(s) of Content Associated With a Communication Platform", 46 pages.
David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.
Mike Issac, "Slack, a Start-Up With an App to Foster Business Collaboration, is Valued at $1.1 Billion", The New York Times Blogs (BITS), Lexisnexis, https://advance.lexis com/api/permalink/3eb84b34-a8f9-4d7d-9573-89d9598a4963/?context=1000516> (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.
Office Action for U.S. Appl. No. 17/064,161, dated Apr. 6, 2021, Weiss, "Snippet(s) of Content Associated With a Communication Platform", 27 Pages.
Office Action for U.S. Appl. No. 17/064,161, dated Dec. 18, 2020, Weiss, "Snippet(s) of Content Associated With a Communication Platform", 23 Pages.
YouTube, "Microsoft Mechanics. How to use Microsoft Teams, a Demo Tutorial", retrieved at <<www.youtube.com/watch?v=CH2seLS5Wb0>>, 2019, 38 pgs.
YouTube, "Teachers Tech. Learn how to use Microsoft Teams—Beginners Tutorial", retrieved at <<www.youtube.com/watch?v=bAesljrem7E>>, 2020, 41 Pages.
Office Action for U.S. Appl. No. 17/508,738, dated Jul. 22, 2022, Weiss, "Snippet(s) of Content Associated With a Communication Platform", 13 Pages.

* cited by examiner

ASYNCHRONOUS COLLABORATION IN A COMMUNICATION PLATFORM

TECHNICAL FIELD

A meeting is an assembly of people to discuss one or more topics. Many various types of meetings exist. Many meetings occur in-person, for example, in a physical location such as a conference room or a restaurant. With advances in technology, meetings are more often occurring virtually, for example via video conferencing or conference calls. Synchronous meetings are scheduled at a particular time and particular date. On the particular time and particular date, attendees of the synchronous meeting show up at the same physical location or join a same video conference for the synchronous meeting. Individuals who are not able to attend a scheduled synchronous meeting have no way of receiving the information discussed during the meeting and miss out on the opportunity to contribute to the discussion. That is, in conventional technology, meetings are synchronous and individuals who are not able to attend a synchronous meeting are not able to participate.

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices (e.g., clients), allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. In some examples, the user interface can present a data feed indicating messages posted to and/or actions taken with respect to a particular channel, direct message, and/or other virtual space.

In some examples, users of the communication platform can schedule in-person and/or virtual meetings via the communication platform. However, individuals who are not able to attend such synchronous meetings scheduled via the communication platform have no way of receiving the information discussed during the meetings and miss out on the opportunity to contribute to the discussion.

BRIEF DESCRIPTION OF THE FIGURES

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
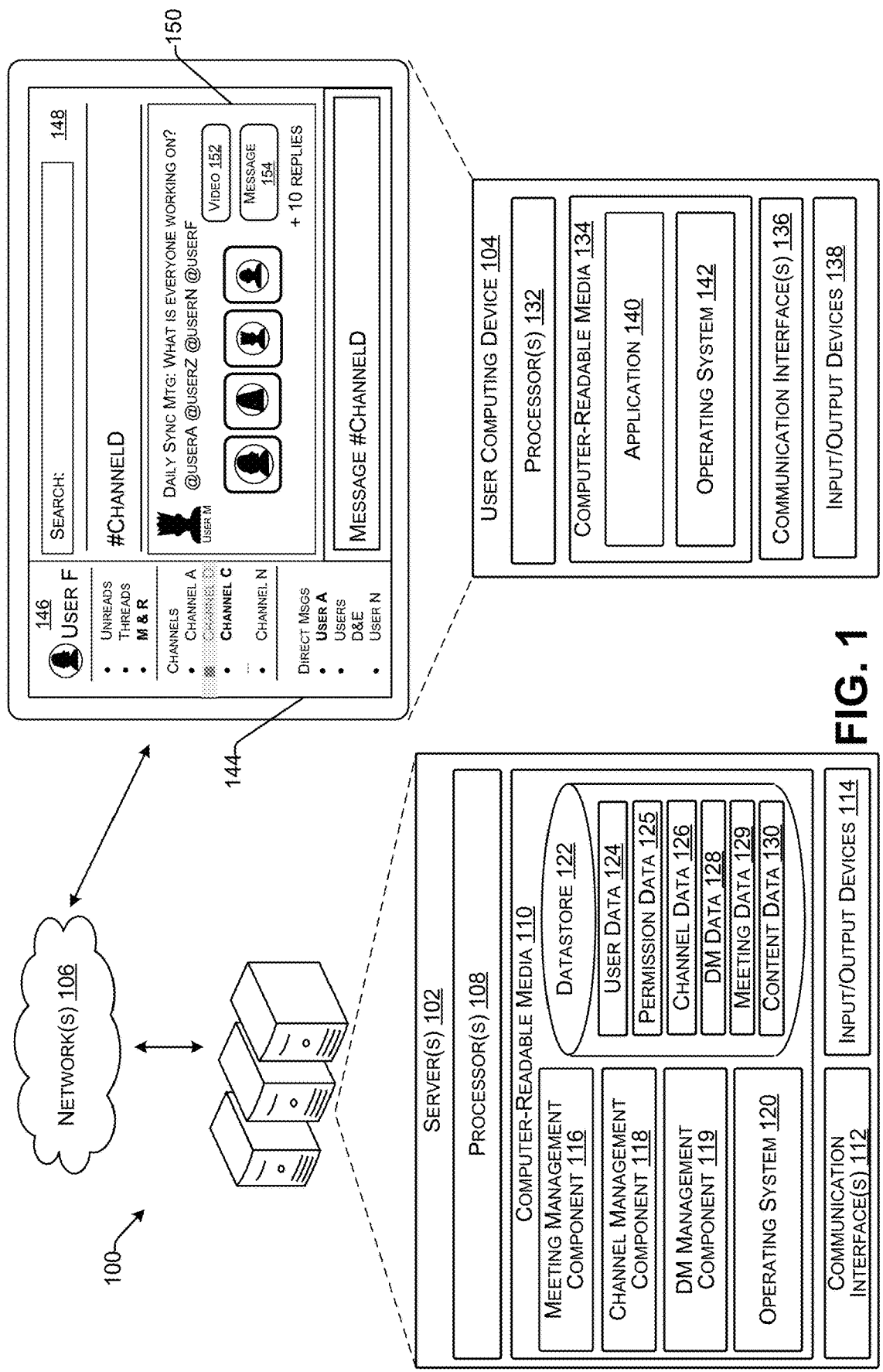
FIG. 1 illustrates an example environment for performing techniques described herein.

This application relates to asynchronous collaboration in a communication platform. The communication platform, which, in some examples can be a group-based communication platform, a channel-based communication platform, a permission-based communication platform, a channel-based messaging platform, and/or any other platform for facilitating communication between and among users, can enable users to exchange messages and/or other data via the communication platform. Conventionally, when a group of users wants to call a meeting, a meeting organizer sends a calendar invite to each of the users of the group of users. The calendar invite typically includes a uniform resource locator (URL) associated with a virtual meeting location, a conference call dial-in number, or a location of a physical meeting location. Of course, meetings can be organized without a calendar invite (e.g., by word of mouth or the like). Conventionally, at the scheduled meeting time, the group of users use the URL to join the meeting virtually (e.g., via the virtual meeting location), dial the conference call dial-in number, or meet at the physical location synchronously (i.e., at the same time and same place). If a user cannot join such a synchronous meeting at the scheduled time, the user misses the meeting.

Techniques described herein enable users to "attend" or participate in an asynchronous meeting at any time or place that is convenient for them, using functionality available via a communication platform. That is, techniques described herein enable asynchronous meetings. Asynchronous meetings can be "one-off" meetings (e.g., quick feedback meetings, one-off decision-making meetings, announcements, meetings showing work in progress, etc.) or scheduled, recurring meetings (e.g., standup meetings, project status meetings, demo meetings, sales forecast meetings, etc.). In at least one example, a message representative of an asynchronous meeting can be posted to a virtual space (e.g., a channel, a direct message, a board, a virtual meeting hub, etc.) of the communication platform. In some examples, an asynchronous meeting is an asynchronous collaboration session, where attendees of the session may post video replies to form an asynchronous content thread and/or feed.

In at least one example, an asynchronous meeting can be associated with one or more topics. As such, the message posted to the virtual space can be associated with one or more topics. In some examples, one or more users can be tagged in the message as attendees of the asynchronous meeting. That is, one or more user identifiers associated with the one or more users can be associated with the message and, based at least in part on such an association, the one or more users can receive a notification associated with the asynchronous meeting. Such a notification can prompt, or otherwise request, the attendees to reply with content. In at least one example, individual users who are tagged in the message can post content, such as text content, audio content, and/or visual content (e.g., image content, video content, etc.), to the virtual space associated with the message. That is, each of the attendees of the asynchronous meeting can "reply" to the message by posting a message update, a video update, and/or the like that is associated with the message. Not only can meeting attendees attend the asynchronous meeting asynchronously, at a time or place that is convenient for them; they also have the ability to participate in whatever modality (e.g., video, audio, screen-share, messages, etc.) that is convenient for them.

In some examples, each of the replies can be associated with a thread of the message, wherein replies are not posted to the virtual space with which the message is associated but instead are maintained in an object associated with the original message. As such, attendees of the asynchronous meeting can receive updates and/or participate in a conversation associated with the asynchronous meeting on their own time and in their own location (i.e., asynchronously). By grouping replies in a thread, the discussion associated with the asynchronous meeting can be maintained in an object so that attendees can easily follow discussion relevant to the asynchronous meeting and can have access to content data to enable attendees to understand the discussion associated with the asynchronous meeting (e.g., without getting distracted by other happenings in the virtual space). In some examples, when replies are audio/visual content, such as videos and/or snippets of content, the meeting can comprise a content thread and/or feed such that individual videos and/or snippets of content can be presented inline with the message with which the asynchronous meeting is associated. In some examples, previews of individual videos and/or snippets of content can be presented in association with the message (e.g., as content of the message). In some examples, the previews can be configured in a tile summary. In some examples, based at least in part on actuating an affordance for viewing a video and/or snippet of content, the videos and/or snippets of content can be presented in the thread and/or feed and a user can view individual of the videos and/or snippets of content (in some examples, without requesting to view each one individually). In at least one example, each of the videos and/or snippets of content can be individually interactable (e.g., a user can reply to a video and/or snippet of content, react to a video and/or snippet of content, etc.).

In some examples, a meeting organizer can post a message representative of an asynchronous meeting to a virtual space. In some examples, a message representative of an asynchronous meeting can be posted by the communication platform (i.e., automatically). That is, in some examples, a meeting organizer can generate a scheduled asynchronous meeting, for example, via a meeting generation user interface. In some examples, a scheduled meeting can be generated by a bot, can be associated with a reminder, can be generated via a workflow, etc. In any event, a scheduled meeting can be associated with a date, a time, or another condition. In at least one example, based at least in part on a determination that a current date and/or current time correspond to the date and/or the time of the scheduled meeting, or another condition is otherwise satisfied, the communication platform can cause a message representative of the scheduled meeting to be presented via a virtual space. That is, a message representative of the scheduled meeting can be displayed, in association with the virtual space, via a user interface of the communication platform based at least in part on satisfaction of a condition. In at least one example, each of the users tagged as attendees of an asynchronous meeting (e.g., scheduled or otherwise) can receive a notification associated with the message, which can prompt each of the attendees to reply to the message as described above. In some examples, all users that are associated with the communication platform, a virtual space (e.g., a channel, direct message, board, virtual meeting hub, or the like), a group, a sub-group, etc. are able to view and interact with content associated with the asynchronous meeting by posting a reply to the associated message. In some examples, such interactions can be limited to attendees of the asynchronous meeting (e.g., users tagged as attendees).

Techniques described herein can enable the combination of audio content, visual content (e.g., image content, video content, etc.), and/or text content to be associated with a rich thread or feed of a message. The integration of audio, visual, and/or text into a rich thread or feed, enables users associated with the message and/or thread to receive updates asynchronously. As stated above, there are challenges with conventional, synchronous meetings. That is, with existing technology, if a meeting attendee cannot attend a synchronous meeting due to a conflict, they miss out on the information shared during the synchronous meeting, regardless of whether the synchronous meeting is held virtually or in-person. To the extent absent attendees are able to receive a meeting update after the synchronous meeting concludes (from a present attendee), such a summary may not be accurate, and the absent attendees may still miss some of the information shared during the synchronous meeting. As such, techniques described herein enable users to participate in asynchronous meetings such that attendees can post content and consume (i.e., view and/or interact with) content on their own time, in their own locations. That is, techniques described herein improve technology by creating a virtual space for asynchronous collaboration via a communication platform.

While techniques described herein can provide an unconventional mechanism for hosting and/or participating in a meeting, techniques described herein can improve computing devices and/or technology associated with communication platforms. For example, scheduling synchronous meetings with multiple attendees can be incredibly burdensome. Multiple communications—emails, text messages, messages via a communication platform, etc.—can be exchanged to determine a best time for a synchronous meeting. Then, many times, after a meeting is scheduled, one or more additional communications are exchanged due to scheduling conflicts that require rescheduling, etc. That is, scheduling meetings often consumes computing resources and causes network congestion. Techniques described herein alleviate such concerns and therefore offer improvements to computing devices and/or technology. That is, enabling asynchronous meetings via a communication platform alleviates the need to exchange communications to schedule, reschedule, etc. synchronous meetings. Therefore, techniques described herein enable the conservation of computing resources and decongestion of networks.

Additional or alternative benefits offered by techniques described herein are described herein.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, messages, and/or virtual spaces, have security (that can be defined by permissions) to limit access to defined groups of users, such a defined group of users having, for instance, sole access to a given channel, message, and/or virtual space. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other, within secure and private virtual spaces, such as channel(s), direct message(s), board(s), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces or a workspace can be associated with multiple organizations.

In at least one example, the server(s) 102 can communicate with a user computing device 104 via one or more network(s) 106. That is, the server(s) 102 and the user computing device 104 can transmit, receive, and/or store data (e.g., content, messages, data, or the like) using the network(s) 106, as described herein. In some examples, the user computing device 104 can comprise a "client" associated with a user. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., based at least in part on an organization chart) and/or types (e.g., administrator, verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, messages, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a meeting management component 116, a channel management component 118, a direct message management component 119, an operating system 120, and a datastore 122.

In at least one example, the meeting management component 116 can manage meetings associated with the communication platform. That is, the meeting management component 116 can facilitate the generation of, storage of, initiation of, and/or other management of meetings, such as asynchronous meetings, or other communication events associated with the communication platform. In at least one example, the meeting management component 116 can cause an affordance for generating an asynchronous meeting to be presented via a user interface associated with a communication platform. In at least one example, based at least in part on receiving an indication of an interaction with the affordance (e.g., which can be associated with a request to generate and/or otherwise initiate a meeting), the meeting management component 116 can cause a meeting generation user interface to be presented via the user interface of the communication platform. In some examples, the meeting generation user interface can be a pop-up, overlay, or other user interface element presented via the user interface of the communication platform. In some examples, the meeting generation user interface can take over the user interface of the communication platform or comprise a new user interface. In some examples, a meeting generation user interface can be presented in response to an additional or alternative interaction with the user interface.

In at least one example, the meeting generation user interface can include one or more user interface elements which guide a first user (e.g., a meeting organizer) to input meeting details associated with an asynchronous meeting. Meeting details can include a title and/or topic of the asynchronous meeting, a date of the asynchronous meeting, a time of the asynchronous meeting, a recurrence of the asynchronous meeting, a description of the asynchronous meeting, attendees of the asynchronous meeting, and/or other meeting details. In at least one example, an asynchronous meeting can be recurring such that it recurs at a designated frequency, such as hourly, daily, weekly, monthly, etc. In some examples, the meeting configuration user interface can enable a link, a file, or other object to be associated with the asynchronous meeting. In some examples, the meeting management component 116 can utilize context data associated with the meeting generation request to generate recommendations for meeting details. Additional details are provided below.

In at least one example, based at least in part on the user inputting data into the meeting generation user interface, the meeting management component 116 can receive such data and can generate an asynchronous meeting. In some examples, an asynchronous meeting can be associated with an object or other data structure and can be stored in the datastore 122.

In some examples, the first user can tag one or more second users (e.g., meeting attendees) in the message. In some examples, such a tag can be an "invitation" to join an asynchronous meeting. In some examples, the first user can identify the one or more second users via an input to the message generation user interface. In some examples, the first user can tag a second user via a mention, a profile view, an email, or generating a link from the meeting generation interface that enables a second user to be added as an attendee of the asynchronous meeting. In at least one example, the meeting management component 116 can associate one or more second user identifiers associated with the one or more second users with the asynchronous meeting. In some examples, tagging a user or mentioning a user may cause a meeting notification and/or a request for content to be sent to the user.

In some examples, asynchronous meetings can be generated ad hoc such that the first user can generate an asynchronous meeting via the meeting generation user interface and the meeting management component 116 can post a message associated with the asynchronous meeting to a virtual space, such as a channel, a direct message, a board, a virtual meeting hub, etc. as soon as the asynchronous meeting is generated. Such asynchronous meetings can be "one-off" meetings or an initial meeting of a set of recurring meetings. In some examples, asynchronous meetings can be scheduled such that the first user can generate an asynchronous meeting via the meeting generation user interface and the meeting management component 116 can post a message associated with the asynchronous meeting to a virtual space at a later time. In some examples, a scheduled asynchronous meeting can be posted automatically by the meeting management component 116 in response to a determination that a current date and/or time corresponds to a date and/or time associated with a scheduled asynchronous meeting or that another condition associated with the asynchronous meeting is satisfied. As described above, asynchronous meetings can be associated with objects for storage in the datastore 122. In some examples, meeting objects can be associated with metadata indicating meeting details. In some examples, scheduled asynchronous meetings can be recurring meetings. In some examples, scheduled asynchronous meetings can be associated with reminders, workflows, bots, and/or the like.

In at least one example, the meeting management component 116 can cause a message associated with the asynchronous meeting to be presented, in association with the virtual space, via the user interface of the communication platform. As described above, the virtual space can be a channel, a direct message, a board, a virtual meeting hub, and/or the like. In at least one example, the message associated with the asynchronous meeting is viewable by each member of the virtual space (e.g., each user permissioned to access the virtual space). In some examples, any users who are members of the associated virtual space can see the message and/or interact with the message and/or content associated therewith. In some examples, a subset of members, such as users from a specific organization (e.g., in an externally shared channel), attendees of the asynchronous meeting, etc. can see the message and/or interact with the message and/or content associated therewith. In at least one example, if the request is associated with meeting details, a link, a file, or other object, the message, when presented via the user interface, can be associated with the meeting details, the link, the file, or the other object. In at least one example, each of the second user(s) can be tagged or otherwise identified in the message when presented via the user interface. In some examples, the message associated with the asynchronous meeting can be associated with content provided by the first user (e.g., the meeting creator). In some examples, a user interface element representative of the message and/or asynchronous meeting can be associated with an affordance to add a video, a message, and/or other content to the asynchronous meeting.

In some examples, the meeting management component 116 can send a notification to clients of attendees of the asynchronous meeting (e.g., notifying them of the asynchronous meeting and/or requesting content). In at least one example, the attendees of the asynchronous meeting can comprise the first user and the one or more second users. In some examples, the attendees of the asynchronous meeting can represent a subset of the members of the virtual space to which the message is posted. In some examples, the attendees of the asynchronous meeting can be associated with a same group or different groups. That is, in some examples, an asynchronous meeting can be internally or externally shared. In some examples, an attendee of the attendees can be a guest user invited to the asynchronous meeting. In at least one example, such a guest user can be added to the virtual space to which the message is posted. In at least one example, such a guest user can have access to the message and the replies, but may not be permitted to access other aspects of the virtual space to which the message is posted. In some examples, a guest user may be required to join the virtual space as a member prior to accessing the message and/or replying to the message.

In some examples, a notification sent to each of the attendees can cause a user interface element to be presented via an instance of the user interface presented via the respective clients. In some examples, the notification can prompt each of the attendees to post a reply (e.g., a video, a message, and/or other content) to the message (i.e., participate in the asynchronous meeting). In some examples, the meeting management component 116 can receive content from clients of the attendees. In some examples, the content can comprise text, audio content, visual content (e.g., image content and/or video content), combinations of the foregoing, and/or the like. In some examples, such content can comprise a snippet of content, as described below. In at least one example, the meeting management component 116 can receive the content, associate the content with the asynchronous meeting (e.g., the meeting object), and can cause the content to be presented, in association with the message, via the user interface. In some examples, content can be compiled to create a collection of content (e.g., a collection of messages, a collection of videos, a collection of a combination of messages and/or videos) that is associated with the asynchronous meeting and presented at least in part with the message representative of the asynchronous meeting.

As described above, in some examples, individual of the attendees can reply with snippets of content. In at least one example, a snippet of content can comprise audio content, image content, and/or video content. In some examples, a snippet of content can be ephemeral, such that the snippet of content is available for viewing for a predetermined period of time, after which the snippet of content is no longer available for viewing. In some examples, snippets of content can be available for consumption asynchronously, such that individual users can view the snippets of content at different times (e.g., on their own time, so long as the snippet of content is still available). Additional details associated with snippets of content are described in U.S. patent application Ser. No. 17/064,161, filed on Oct. 6, 2020, the entire contents of which are incorporated by reference herein. In some examples, groups of snippets of content can be threaded together to create a content thread and/or feed as described herein.

In some examples, each reply received from an attendee of an asynchronous meeting can be associated with the message such that content posted by individual of the attendees can be presented in association with the message in the user interface of the communication platform. In some examples, the replies can comprise the content of the message. In some examples, a preview of one or more of the replies can be presented in association with a message (e.g., a user interface element representative thereof). That is, in some examples, the meeting management component 116 can cause a preview summary of one or more items of content (e.g., text, image, audio, video, combinations of the foregoing, etc.) to be presented in association with the message. In some examples, the preview summary can be presented based at least in part on a determination that a number of users that have contributed content meets or exceeds a threshold. In at least one example, the preview summary can include representations of each of the items of content contributed by attendees of the asynchronous meeting. In some examples, the preview summary can include representations of a subset of all items of content contributed by attendees of the meeting. In some examples, a preview summary can comprise a tile preview summary wherein individual items of content can be represented as tiles associated with a message. Each of the tiles can be independently interactable and, in some examples, can trigger a content thread and/or feed, as described below. In at least one example, each item of content presented via the preview summary can be viewable via a thread and/or feed associated with the message representative of the asynchronous meeting.

In some examples, the message (i.e., associated with the asynchronous meeting) can be a "parent" message and each of the replies can be associated with the parent message as a thread. In such examples, the parent message and each of the replies can be associated with a same thread identifier, which in some examples can correspond to a meeting identifier (which can be associated with a meeting object of the asynchronous meeting). As such, the replies can be associated with the same object as the parent message instead of with individual objects in the virtual space. In some examples, individual of the replies can be presented in association with the message representative of the asynchronous meeting. In some examples, a digest indicator indicating a number of replies, users who have responded, etc. can be associated with the message representative of the asynchronous meeting. In some examples, the digest indicator can be associated with an actuation mechanism to cause individual of the replies to be presented via a user interface, for example, in a thread or a feed. In at least one example, actuation of the actuation mechanism can cause at least one reply to be presented via the user interface. In some examples, actuation of the actuation mechanism can cause each of the replies to be presented sequentially without further input from a user. That is, in at least one example, a content thread and/or feed can be presented for viewing and/or interaction by an attendee.

In at least one example, individual of the replies can be viewed asynchronously and can be individually interactable. For example, wherein the replies comprise snippets of content, a first client of a first attendee of the asynchronous meeting can request to view a first snippet of content posted by a second attendee and the meeting management component 116 can cause the first snippet of content to be presented via the first client. At a same or different time, a second client of a third attendee of the asynchronous meeting can request to view the first snippet of content or a second snippet of content posted by another attendee and the meeting management component 116 can cause the requested snippet of content to be presented via the second client. The first attendee or the third attendee can interact with the first snippet of content and the second snippet of content, respectively. For example, the first attendee or the third attendee can reply to a respective snippet of content, associate a reaction (e.g., an emoji, a reactji, etc.) with a respective snippet of content, and/or the like. Such replies can be associated with the individual snippets of content in the thread. As such, the thread can be a rich thread comprising text content, audio content, visual content (e.g., audio content or video content), combinations of the foregoing, and/or the like.

In some examples, a single asynchronous meeting can be associated with multiple topics. In some such examples, there can be multiple threads of content. That is, in some examples, a single message, associated with a message identifier, can be associated with multiple thread identifiers, which can each correspond to a different topic of the asynchronous meeting. Content associated with individual of the topics can be associated with the same thread identifiers and can thus be associated with individual threads.

In some examples, scheduled asynchronous meetings can be generated in response to detecting an interaction with an affordance presented via the user interface of the communication platform, as described above. However, scheduled asynchronous meetings can be generated via additional or alternative mechanisms, such as via a bot (e.g., based on detecting an intent to schedule a meeting, etc.), in association with a reminder, in association with a calendar appointment, in association with a workflow, or the like.

In some examples, asynchronous meetings, regardless of how they are scheduled, can be associated with an object that is stored in the datastore 122. Such an object can be a meeting object, which can be associated with a meeting identifier. As described above, a message associated with an asynchronous meeting can be presented based at least in part on detecting satisfaction of a condition associated with the asynchronous meeting (e.g., a current date and/or time corresponds to a date and/or time associated with an asynchronous meeting, context, etc.). That is, based at least in part on determining satisfaction of a condition associated with an asynchronous meeting, the meeting management component 116 can cause a message representative of the asynchronous meeting to be presented in a virtual space associated with the communication platform. In at least one example, the message object can be associated with a meeting identifier, one or more user identifiers (e.g., indicating the attendee(s) of the asynchronous meeting), an originating user identifier (e.g., indicating the message originator), one or more invitee user identifier(s), identifier(s) of virtual space(s) to which the message is to be posted, content associated with the message (e.g., prior to the start of the asynchronous meeting), metadata associated with meeting details, etc. In at least one example, the message can be associated with identifier(s) of virtual space(s) such that each time the virtual space is presented via the user interface of the communication platform, the message is presented (so long as it is in view). In at least one example, the message can be associated with at least one thread identifier (which, in some examples, can be a meeting identifier) and each reply posted in response to the message can be associated with the same thread identifier. As such, content associated with the replies can be mapped to, or otherwise associated with the same message object. Further, in some examples, when the message object is the subject of an interaction via the user interface, one or more of the replies can be presented in association with the message. As described above, in some examples, a message object can be associated with multiple thread identifiers and multiple threads of replies.

In at least one example, the meeting management component 116 can track views, interactions, etc. with individual of the replies (e.g., items of content) associated with an asynchronous meeting. In some examples, the meeting management component 116 can cause a user interface to be presented to enable a user, such as the meeting organizer, to view such data (e.g., views, interactions, etc.).

In at least one example, the channel management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform such as, for example, content and/or messages. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, administrator, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" can refer to a channel which is accessible across different organizations, whereas an "internal channel" can refer to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the channel management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118 can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or messages). In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) (e.g., recipient user(s)) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 125, channel data 126, direct message (DM) data 128, meeting data 129, and content data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"). In some examples, a user can be associated with a single user profile. In some examples, a user can be associated with multiple user profiles. A user profile can store data associated with a user, including, but not limited to, one or more user identifiers associated with multiple, different organizations, groups, or entities with which the user is associated, one or more group identifiers for groups (or, organizations, teams, entities, or the like) with which the user is associated, one or more channel identifiers associated with channels to which the user has been granted access, an indication whether the user is an owner or manager of any channels, an indication whether the user has any channel restrictions, one or more direct message identifiers associated with direct messages with which the user is associated, one or more board identifiers associated with boards with which the user is associated, one or more meetings with which the user is associated, a plurality of messages, a plurality of emojis, a plurality of conversations, a plurality of conversation topics, an avatar, an email address, a real name (e.g., John Doe), a username (e.g., j doe), a password, a time zone, a status, and the like.

In at least one example, the permission data 125 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 125 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 125 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 126. In some examples, permissions can indicate restrictions on individual channels, restrictions on user(s) associated with individual channels, and the like.

In some examples, the permission data 125 can store data associated with permissions of individual messages or other objects. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user (e.g., the originator of the message), or the like. In some examples, permissions associated with a message or other object can be mapped to, or otherwise associated with, data associated with the message or other object. In some examples, permissions can indicate viewing permissions, access permissions, editing permissions, etc.

In at least one example, the channel data 126 can store data associated with individual channels. In at least one example, the channel management component 118 can establish a channel between and among various user computing devices, allowing the user computing devices to communicate and share data between and among each other. In at least one example, a channel identifier may be assigned to a channel, which indicates the physical address in the channel data 126 where data related to that channel is stored. Individual messages or other objects posted to a channel can be stored in association with the channel data 126.

In at least one example, the DM data 128 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 128 where data related to that direct message is stored. Individual messages or other objects posted to a direct message can be stored in association with the DM data 128.

As described above, messages posted, or otherwise sent and/or received, via channels, direct messages, etc. can be stored in associated with the channel data 126 and/or DM data 128. In some examples, such messages can additionally or alternatively be stored in association with the user data 124. In some examples, messages can be associated with individual permissions, as described herein.

In at least one example, meeting data 129 can store data associated with asynchronous meetings. As described above, in some examples, asynchronous meetings, regardless of how they are scheduled, can be associated with an object that is stored in the datastore 122. Such an object can be a meeting object, which can be associated with a meeting identifier. In at least one example, the message object can be associated with a meeting identifier, one or more user identifiers (e.g., indicating the attendee(s) of the meeting), an originating user identifier (e.g., indicating the message originator), one or more invitee user identifier(s), identifier(s) of virtual space(s) to which the message is to be posted, content associated with the message (e.g., prior to the start of the meeting), metadata associated with meeting details, etc. In at least one example, the message can be associated with identifier(s) of virtual space(s) such that each time the virtual space is presented via the user interface of the communication platform, the message is presented (so long as it is in view). In at least one example, the message can be associated with at least one thread identifier (which, in some examples, can be a meeting identifier) and each reply posted in response to the message can be associated with the same thread identifier. As such, content associated with the replies can be mapped to, or otherwise associated with the same message object. Further, in some examples, when the message object is the subject of an interaction via the user interface, one or more of the replies can be presented in association with the message.

In at least one example, content data 130 can comprise content posted to channels, direct messages, meetings, etc. Content data 130 can include text content, audio content, visual content (e.g., image content and/or video content), combinations of the foregoing, etc. In at least one example, content stored in the content data 130 can be associated with a creator identifier (e.g., a user who created the content), a thread identifier (e.g., which thread the content is associated with), a message identifier (e.g., which message the content is associated with), a virtual space identifier (e.g., virtual space(s) with which the content is associated with and/or accessible by), etc. Interactions associated with content can also be stored in association with the content in the content data 130. That is, replies, reactions, etc. associated with individual content can be stored in association with the content. In some examples, content can be mapped to, or otherwise associated with, individual users, messages, meetings, channels, direct messages, and/or the like.

The datastore 122 can store additional or alternative types of data, which can include, but is not limited to board data (e.g., data posted to or otherwise associated with boards of the communication platform), interaction data (e.g., data associated with additional or alternative interactions with the communication platform), model(s), etc.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), Hyper Text Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

In at least one example, the user computing device 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

As described above, a client, which can be associated with the user computing device 104, can present one or more user interfaces. A non-limiting example of a user interface 144 is shown in FIG. 1. As illustrated in FIG. 1, the user interface 144 can present data associated with one or more channels, direct messages, or other virtual spaces. In some examples, the user interface 144 can include a first section 146 (e.g., which can be a portion, pane, or other partitioned unit of the user interface 144), that includes user interface element(s) representing data associated with channel(s), direct message(s), etc. with which the user (e.g., account of the user) is associated. Additional details associated with the first section 146 and user interface element(s) are described below with reference to FIG. 2A.

In at least one example, the user interface 144 can include a second section 148 (e.g., which can be a portion, pane, or other partitioned unit of the user interface 144) that can be associated with a data feed indicating messages posted to and/or actions taken with respect to one or more channels, direct messages, and/or other virtual spaces for facilitating communications (e.g., a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated data feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) posted the message and/or performed an action. In examples where the second section 148 presents data associated with multiple workspaces, at least some data can be associated with an indication of which workspace the data is associated with.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 2A.

In at least one example, a message representative of an asynchronous meeting can be posted to a virtual space. As illustrated in FIG. 1, a user interface element 150, associated with the message, can be displayed via the user interface 144. In some examples, a user can post a message that is associated with an asynchronous meeting or the meeting management component 116 can post a message that is associated with an asynchronous meeting in a virtual space such as a channel, a direct message, a board, a virtual meeting hub, and/or the like. The message can be associated with one or more attendees. Meeting attendees can comprise users who are tagged in the message. In at least one example, attendees can be notified when a message is posted to a virtual space and can reply to the message, thereby contributing to the asynchronous meeting. In at least one example, the user interface element 150 can include one or more affordances, such as a first user interface element 152 and a second user interface element 154. The first user interface element 152 can be associated with an actuation mechanism that enables a user to upload and/or record a video. The second user interface element 154 can be associated with an actuation mechanism that enables a user to upload and/or compose a message. In at least one example, actuation of the first user interface element 152 and/or the second user interface element 154 can cause an input user interface to be presented via the user interface 144. The input user interface can enable the user to upload and/or create new content such as a video or message While "video" and "message" are explicitly called out, in some examples, the user interface 144 can have a single affordance that causes an input user interface to be presented such that the input user interface is configured to receive and/or generate different types of content. Additional or alternative affordances can be presented via the user interface 144 (e.g., in association with the user interface element 150 or not).

In at least one example, "replies" can comprise text content, audio content, video content, combinations of the foregoing, etc. In some examples, individual of the replies can be snippets of content, as described above. In at least one example, individual replies can be associated with the message representative of the asynchronous meeting as thread messages. In some examples, replies associated with an asynchronous meeting can be presented in a preview summary, wherein individual of the replies can be selected for viewing and/or other interaction. In some examples, each message can be associated with an object associated with the original message instead of being posted to the same virtual space in which the original message is posted. In some examples, individual of the replies can be presented via a thread and/or feed associated with the message. In at least one example, individual of the replies can be interactable such that other meeting attendees can comment, react (e.g., via an emoji, reactji, etc.), etc. to posted content in the thread and/or feed. As such, attendees of the meeting can contribute and/or participate in the asynchronous meeting asynchronously, at their own time and own locations without missing out on information conveyed during the asynchronous meeting. Further, such asynchronous meetings alleviate computing resource consumption and/or network congestion associated with scheduling and hosting synchronous meetings. Additional details are provided below.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, microphones, cameras, connection ports and so forth.

While techniques described herein are described as being performed by the meeting management component 116, the channel management component 118, the direct message management component 119, and the application 140, techniques described herein can be performed by any other component, or combination of components, which can be associated with the server(s) 102, the user computing device 104, or a combination thereof.

Figure 2A:
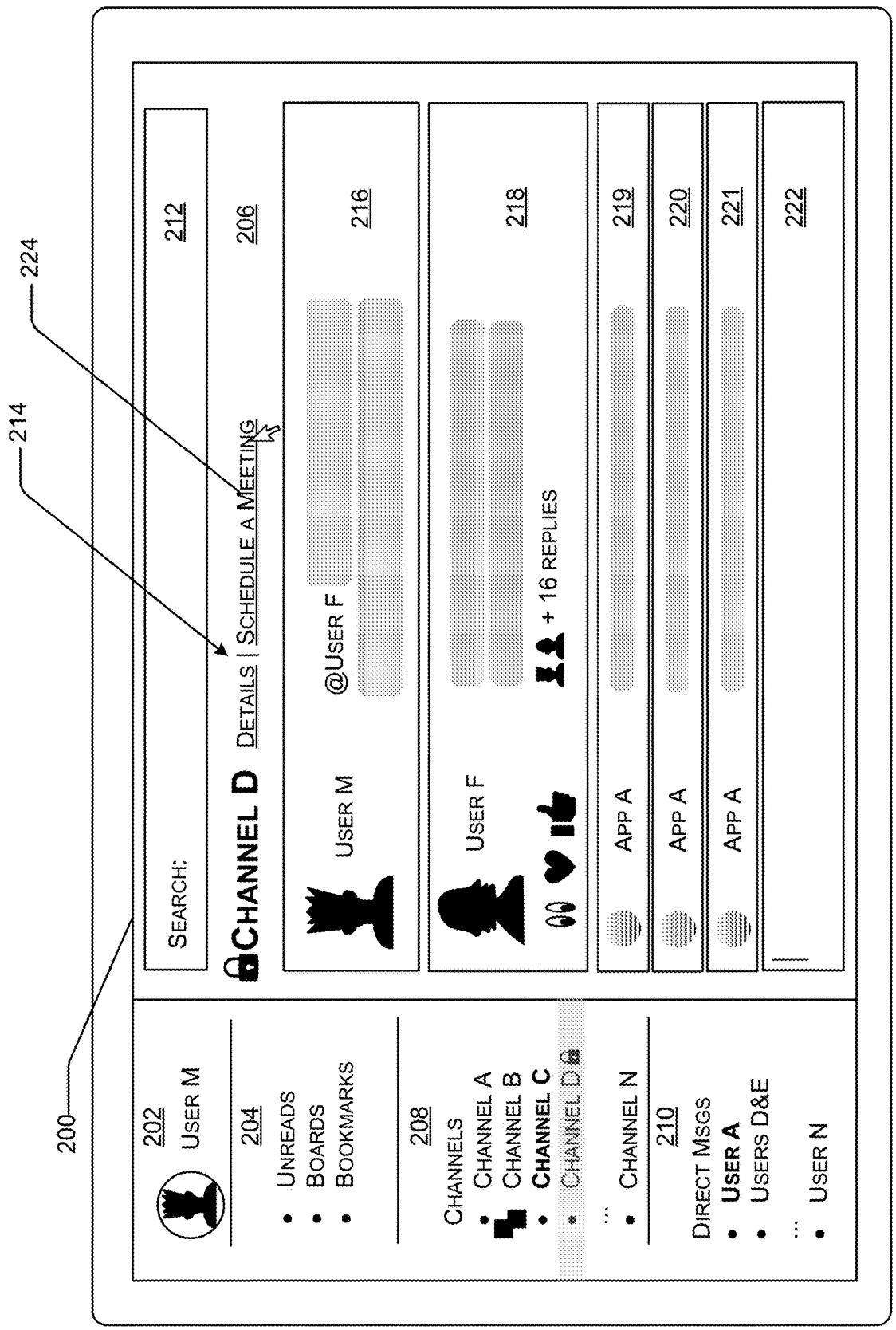
FIG. 2A illustrates an example user interface associated with a communication platform, as described herein, wherein the user interface includes an affordance to schedule an asynchronous meeting.

FIG. 2A illustrates an example user interface 200 presented via a communication platform, as described herein. The user interface 200 can correspond to the user interface 144 described above with reference to FIG. 1. As described above, in some examples, a user interface 200 presented via the communication platform can include a first section 202 (which can correspond to the first section 146 described above with reference to FIG. 1) that includes user interface element(s) representing virtual space(s) associated with the workspace(s) with which the user (e.g., account of the user) is associated. In at least one example, the first section 202 can include one or more sub-sections, which can represent different virtual spaces. For example, a first sub-section 204 can include user interface elements representing virtual spaces that can aggregate data associated with a plurality of channels and/or workspaces. In at least one example, each virtual space can be associated with a user interface element in the first sub-section 204. In some examples, a user interface element can be associated with an actuation mechanism, that when actuated, can cause the application 140 to present data associated with the corresponding virtual space via a second section 206 of the user interface 200 (which can correspond to the second section 148 described above with reference to FIG. 1).

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 206, for example in a feed.

In another example, "drafts" can be associated with messages or other objects that have not yet been posted to a virtual space or otherwise sent to a receiving entity. In at least one example, a message, while being composed, can be associated with an indicator indicating that the message is a draft and can therefore be associated with the "drafts" referenced in the second sub-section 208.

In another example, "threads" can be associated with messages, files, etc. posted in threads to messages posted in a channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user.

In some examples, if the first sub-section 204 includes a user interface element representative of a virtual space associated with "snippets of content" (e.g., stories) that is actuated by a user, snippets of content associated with the user, which can be associated with different channels and/or virtual spaces, can be presented via the second section 206. In some examples, such snippets of content can be presented via a feed. For the purpose of this discussion, a snippet of content can correspond to audio and/or visual content provided by a user associated with the communication platform.

In another example, a virtual space can be associated with "boards" with which the user is associated. In at least one example, if the user requests to access the virtual space associated with "boards," one or more boards with which the user is associated can be presented via the user interface 200 (e.g., in the second section 206). In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such data can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

In some examples, a virtual space can be associated with all meetings with which a user is associated (e.g., a "virtual meeting hub"). That is, in some examples, if the user requests to access the virtual space associated with "meetings" (or something of the like), meetings with which the user is associated can be presented in the second section 206, for example in a feed. An example of such is provided in FIG. 4, below. In some examples, the virtual meeting hub may include synchronous and asynchronous meetings or collaboration sessions. In some examples, the virtual meeting hub may be organized by meeting type (e.g., asynchronous and synchronous). In some examples, the virtual meeting hub may also include a list of active users currently online and provide a user with a quick way to start a conversation with other active users whether it is via an audio, message, or video-based conversation.

In some examples, data presented via the second section can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) (e.g., member(s) of a channel) posted a message, performed an action, and/or the like. Additional details are described below.

In at least one example, the first section 202 of the user interface 200 can include a second sub-section 208 that includes user interface elements representing channels to which the user (i.e., user profile) has access. In some examples, the channels can include public channels, private channels, shared channels (e.g., between workspaces or organizations), single workspace channels, cross-workspace channels, announcement channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 208 can depict all channels, or a subset of all channels, that the user has permission to access (e.g., as determined by the permission data 125). In such examples, the channels can be arranged alphabetically, based on most recent interaction, based on frequency of interactions, based on channel type (e.g., public, private, shared, cross-workspace, announcement, etc.), based on workspace, in user-designated sections, or the like. In some examples, the second sub-section 208 can depict all channels, or a subset of all channels, that the user is a member of, and the user can interact with the user interface 200 to browse or view other channels that the user is not a member of but are not currently displayed in the second sub-section 208. In some examples, a new channel, generated subsequent to a request received at the channel management component 118 in FIG. 1 and accessible to the user, can be added to the second sub-section 208. The new channel can be generated by the user or added to the second sub-section 208 in reply to acceptance of an invite sent to the user to join a new channel. In some examples, different types of channels (e.g., public, private, shared, etc.) can be in different sections of the second sub-section 208, or can have their own sub-sections or subsections in the user interface 200. In some examples, channels associated with different workspaces can be in different portions of the second sub-section 208, or can have their own sections or subsections in the user interface 200.

In some examples, the indicators can be associated with user interface elements that visually differentiate types of channels. For example, Channel B is associated with a double square user interface element instead of a circle user interface element. As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 208 of the user interface 200. In such examples, the user may navigate to a different interface (not shown) to browse additional channels that are accessible to the user but to which the user is not currently a member.

In addition to the second sub-section 208, the first section 202 can include a third subsection 210 that can include user interface elements representative of direct messages. That is, the third subsection 210 can include user interface elements representative of virtual spaces that are associated with private messages between one or more users, as described above.

As described above, in at least one example, the user interface 200 can include a second section 206 that can be associated with data associated with virtual spaces of the communication platform. In some examples, data presented via the second section 206 can be presented as a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) and/or entity(s) posted the message and/or performed an action.

A "message" can refer to any electronically generated digital object provided by a user using the user computing device 104 and that is configured for display within a channel, a direct message, and/or another virtual space as described herein. In some examples, a user can comment on a message in a "thread." A thread can be a message associated with another message that is not posted to a channel, direct message, or other virtual space, but instead is maintained within an object associated with the original message. Messages and/or threads can be associated with file(s), emoji(s), reactji(s), application(s), etc.

A channel, direct message, or other virtual space can be associated with data and/or content other than messages, or data and/or content that is associated with messages. For example, non-limiting examples of additional data and/or content that can be presented via the second section 206 of the user interface 144 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc.

In some examples, the second section 206 can comprise a feed associated with a single channel. In such examples, data associated with the channel can be presented via the feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission(s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification. The search may be performed with one or more shards associated with each group across which the search is performed.

In FIG. 2A, the user can interact with the user interface element that corresponds to Channel D in the second subsection 208 and as such, a feed associated with the channel can be presented via the second section 206 of the user interface. In some examples, the second section 206 can be associated with a header that includes user interface elements 214 representing data associated with Channel D. Furthermore, the second section 206 can include user interface elements 216, 218, and 220 which each represent messages posted to the channel. As illustrated, the user interface elements representative of the messages 216-220 can include an indication of user(s) and/or entity(s) that posted the message, a time when the message was posted, content associated with the message, reactions associated with the message (e.g., emojis, reactjis, etc.), and/or the like. In at least one example, the second section 206 can include an input mechanism 222, which can be associated with a composition user interface to enable a user to compose a message to be posted to the channel. That is, in at least one example, a user can provide input via the input mechanism 222 (e.g., type, speak, etc.) to generate a new message. In some examples, messages can be generated by applications and/or automatically by the communication platform. In some examples, the second section 206 can include user interface elements representative of other objects and/or data associated with the channel (or other virtual space).

Figure 2B:
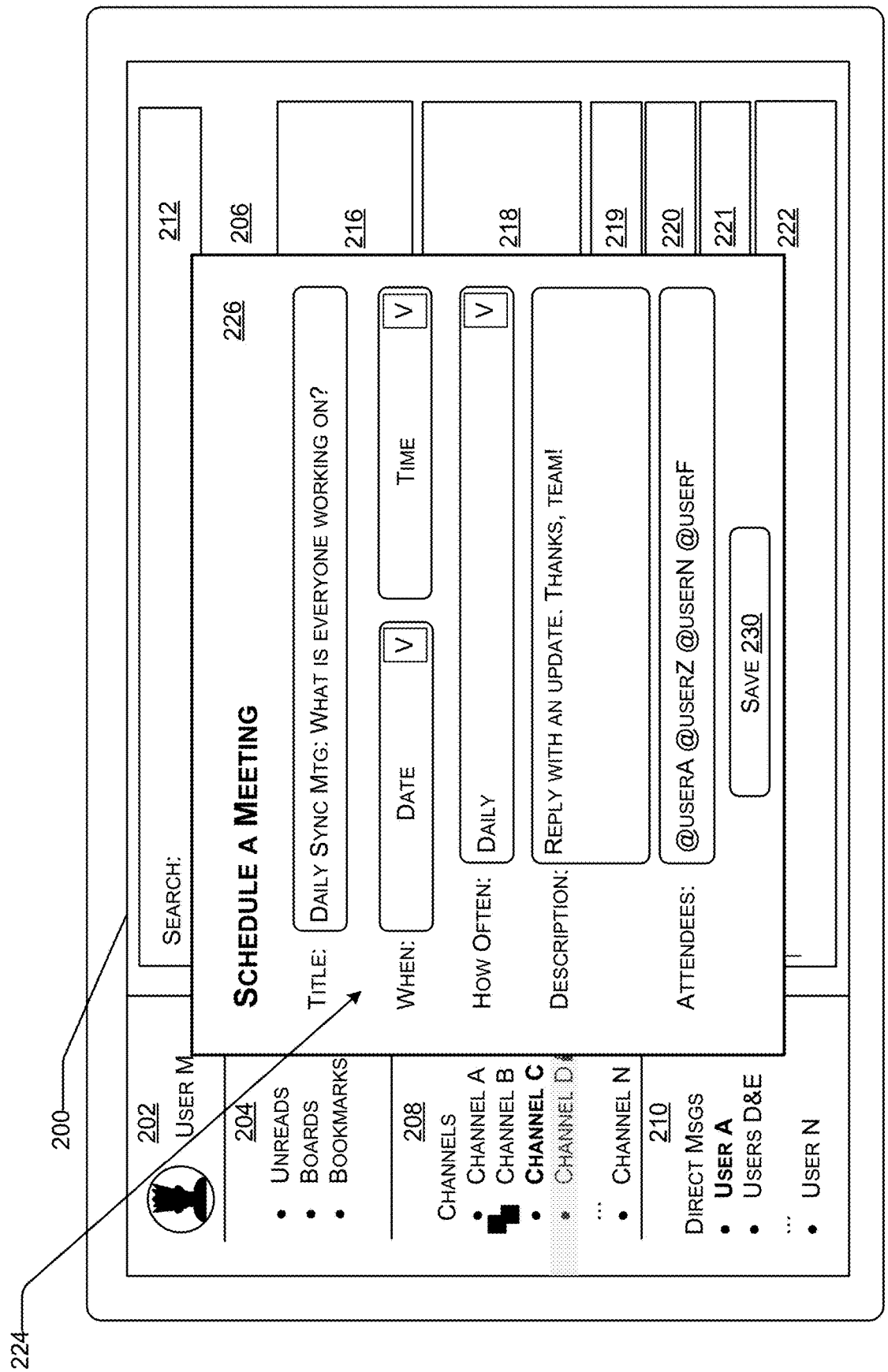
FIG. 2B illustrates another example of the user interface of FIG. 2A, wherein a meeting generation user interface is presented via the user interface to facilitate scheduling an asynchronous meeting.

As described above, in at least one example, the meeting management component 116 can cause an affordance 224 for generating an asynchronous meeting to be presented via the user interface 200. The affordance 224, which can be a user interface element, is shown in association with the user interface elements 214 representative of the channel details (e.g., in the header of the channel), however an affordance can be presented anywhere in the user interface 200. In at least one example, based at least in part on receiving an indication of an interaction with the affordance 224 (e.g., which can be associated with a request to generate and/or otherwise initiate an asynchronous meeting), the meeting management component 116 can cause a meeting generation user interface to be presented via the user interface of the communication platform. An example of the meeting generation user interface 226 is illustrated in FIG. 2B. In some examples, the meeting generation user interface 226 can be a pop-up (as illustrated in FIG. 2B), overlay, or other user interface element presented via the user interface of the communication platform. In some examples, the meeting generation user interface 226 can take over the user interface 200 of the communication platform or comprise a new user interface. In some examples, clicking on an affordance (e.g., a video or other content capturing control) associated with the user interface 200, which in some examples can be associated with a message composition user interface or other input mechanism, can cause an asynchronous meeting to be created. In some examples, a meeting generation user interface such as the meeting generation user interface 226 can be displayed when the affordance is clicked. In some examples, the meeting details may be provided in the text of the message.

In at least one example, the meeting generation user interface 226 can include one or more user interface elements 228 which guide a first user (e.g., a meeting organizer) to input meeting details. Meeting details can include a title and/or topic of an asynchronous meeting, a date of the asynchronous meeting, a time of the asynchronous meeting, a recurrence of the asynchronous meeting, a description of the asynchronous meeting, attendees of the asynchronous meeting, and/or other meeting details. In at least one example, an asynchronous meeting can be recurring such that it recurs at a designated frequency, such as hourly, daily, weekly, monthly, etc. In at least one example, the user interface element(s) 228 can comprise freeform textboxes, drop downs, radio buttons, switches, combinations of the foregoing, etc. In some examples, the meeting generation user interface 226 can enable a link, a file, or other object to be associated with the asynchronous meeting. In at least one example, the meeting generation user interface 226 can include an affordance 230, which can be a user interface element, to enable the user to save the data input via the meeting generation user interface 226. In at least one example, based at least in part on detecting an interaction with the affordance 230, the application 140 can cause data input into the meeting generation user interface 226 to be sent to the meeting management component 116. In at least one example, the meeting management component 116 can generate a meeting object associated with the asynchronous meeting. The meeting object can be associated with the meeting details, as described above.

In some examples, based at least in part on receiving a request to generate an asynchronous meeting, the meeting management component 116 can access content data to recommend meeting details. For example, the meeting management component 116 can access data associated with a virtual space from which the request to generate was received and can recommend meeting details based at least in part on such data. For instance, the meeting management component 116 can identify a common topic discussed in previous messages associated with the virtual space and can recommend the topic for the meeting topic. In some examples, such topics can be identified based at least in part on recency (e.g., close in time to when the meeting generation request is received), frequency (e.g., occurrence in the virtual space), etc. In some examples, the meeting management component 116 can recommend users to add as meeting attendees based at least in part on members of the virtual space from which the request to generate the asynchronous meeting was received. In some examples, recommended attendees can be based at least in part on users with which the meeting organizer frequently interacts (e.g., above a threshold or relative to other members of the virtual space). In some examples, recommendations for meeting details can be based at least in part on data associated with the communication platform, such that topics can be identified based at least in part on topics commonly used for meetings across users, virtual spaces, groups, etc.

In some examples, an asynchronous meeting may be created through a workflow. In the workflow, a user may provide meeting details similar to those illustrated in meeting generation user interface 226. In some examples, the workflow provides a user interface that allows the user to provide meeting details. In some examples, when the workflow is set up, the workflow may be triggered by an event (e.g., a time or date) to automatically cause a message associated with the asynchronous meeting to be posted to the user interface 200.

Figure 3A:
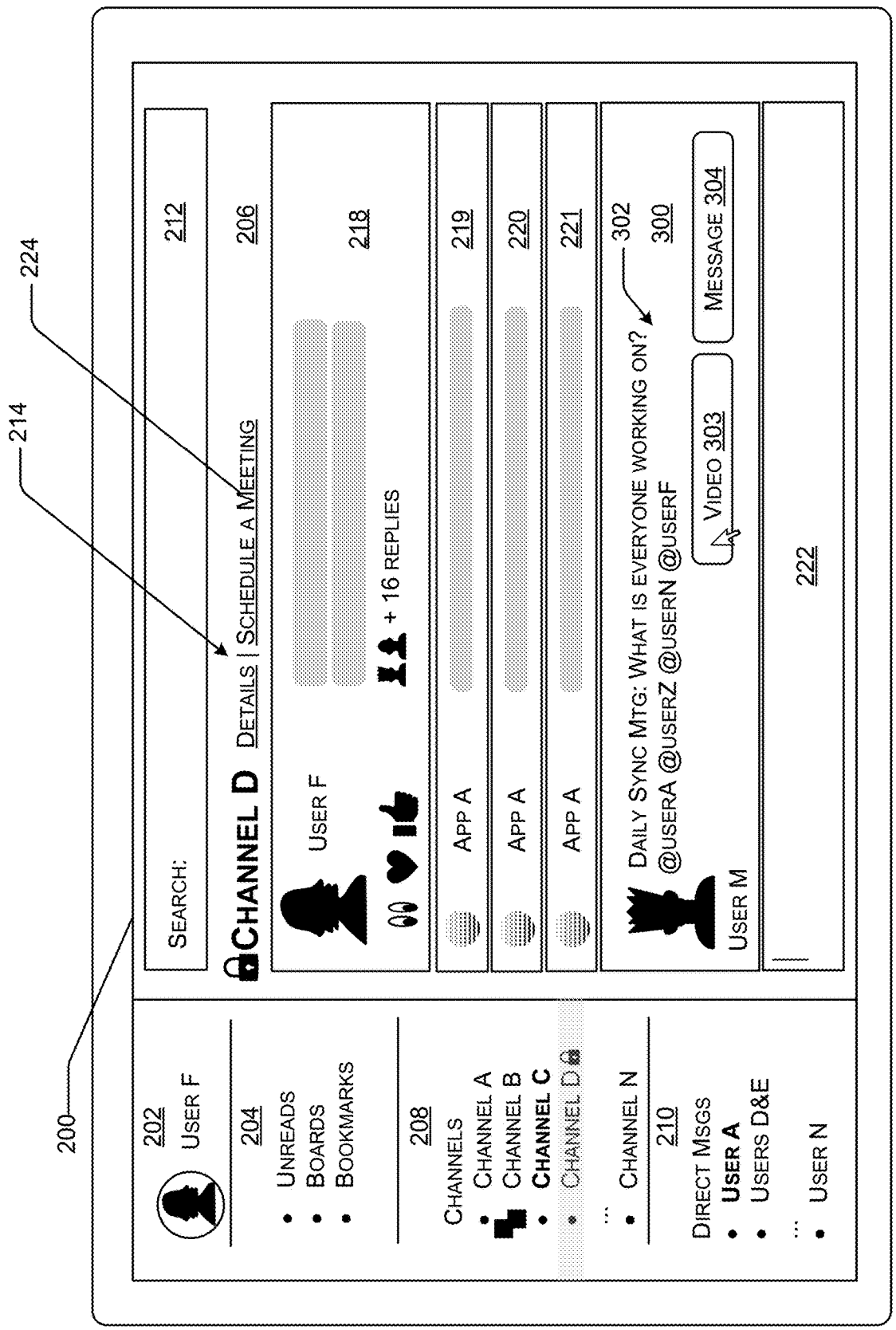
FIG. 3A illustrates another example of the user interface of FIG. 2A, wherein a user interface element representative of an asynchronous meeting is presented in association with a communication channel of the user interface.

FIG. 3A illustrates an instance of the user interface 200 as presented via a client of a user tagged as an attendee of the asynchronous meeting generated in FIG. 2B and/or another member of the virtual space (e.g., Channel D). As described above, in at least one example, the meeting management component 116 can cause a message associated with the asynchronous meeting to be presented, in association with the virtual space, via the user interface of the communication platform. As described above, the virtual space can be a channel, a direct message, a board, a virtual meeting hub, and/or the like. As illustrated in FIG. 3A, a user interface element 300 can be presented via the user interface 200, for example, in association with the feed of Channel D. In at least one example, the message associated with the asynchronous meeting is viewable and/or interactable by each member of the virtual space (e.g., via instances of the user interface 200 presented via respective clients of the other members). In some examples, the message can be viewable and/or interactable by fewer than all members of the virtual space (e.g., users associated with a particular group, users tagged as attendees, etc.). In some examples, messages associated with asynchronous meetings can be associated with different presentation characteristics than messages that are not associated with asynchronous meetings such that they appear visually distinct from messages that are not associated with asynchronous meetings. For example, the user interface element 300 can be a different color, size, shape, etc. than other messages that are not associated with asynchronous meetings. In another example, the user interface element 300 can include one or more controls to enable users to play or reply with audio/visual content associated with the message, as described below.

In at least one example, if the request is associated with meeting details, a link, a file, or other object, the user interface element 300 can be associated with the meeting details, the link, the file, or the other object. In at least one example, each of the user(s) can be tagged or otherwise identified in the user interface element 300. For example, the user interface element 300 includes additional user interface element(s) 302 that indicate a title (or topic) of the asynchronous meeting ("Daily Sync Mtg: What is Everyone Working On?") and the attendees (e.g., User A, User Z, User N, and User F). User M, the meeting originator in this example, can also be considered an "attendee" of the asynchronous meeting. In some examples, an asynchronous meeting can have a single topic. In some examples, asynchronous meetings can have multiple topics.

In some examples, the user interface element 300 can be associated with a user interface elements 303, 304 that can be affordances to enable the user to provide content (e.g., audio and/or visual (e.g., video), text (e.g., message)). The user interface elements 303, 304 can correspond to the user interface elements 152, 154 of FIG. 1. While the user interface elements 303, 304 are illustrated as associated with the user interface element 300, in some examples, the user interface elements 303, 304 can be presented in association with the header of the channel (e.g., proximate the user interface elements 214 representative of the channel details), in association with the input mechanism 222, in another location on the user interface 200, and/or the like. In some examples, content received in response to an interaction with the user interface elements 303 or 304 can be associated with the message identifier, meeting identifier, thread identifier, and/or the like. In some examples, a user who is providing content can be referred to as a "creator."

Figure 3B:
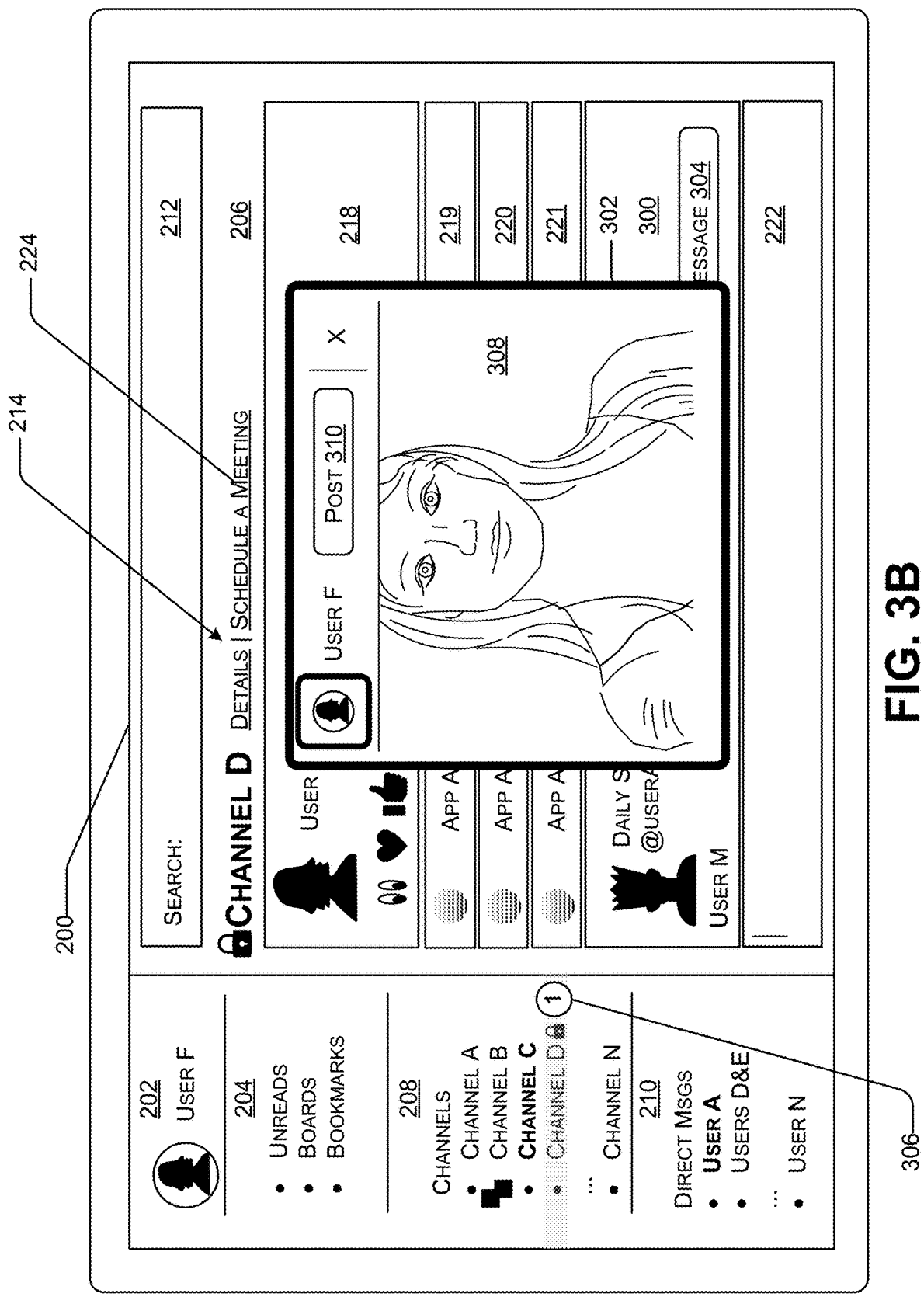
FIG. 3B illustrates another example of the user interface of FIG. 2A, wherein an input mechanism is presented via the user interface to enable a user to generate content to associate with the asynchronous meeting.

In some examples, the meeting management component 116 can send a notification to clients of attendees of the meeting. In some examples, a notification sent to each of the attendees can cause a user interface element 306 to be presented via an instance of the user interface 200 presented via the respective clients, as illustrated in FIG. 3B. In some examples, the notification can prompt each of the attendees to post a reply to the message. While the user interface element 306 is illustrated as a badge, in some examples, an attendee can be notified via a pop-up, a banner, or other user interface element presented via the user interface 200. In some examples, based at least in part on a determination that a tagged user has yet to reply to the message, the meeting management component 116 can send notifications and/or otherwise prompt the tagged user to reply to the message at a particular frequency, after a lapse of a period of time, and/or the like.

In at least one example, actuation of the user interface element 303 or 304 can cause input user interface(s) to be presented via the user interface 200. In at least one example, an input user interface can enable a user to upload and/or generate content to be associated with the user interface element 300 representative of the message. As an example, based at least in part on detecting an interaction with the user interface element 303, an input user interface 308 can be presented via the user interface 200. In some examples, the input user interface 308 can be presented by the application 140, for example, when recording (audio and/or visual) technology is integrated into the application 140). In some examples, the input user interface 308 can be presented via native recording (audio and/or visual) technology that is accessible via the application 140. In some examples, actuating the user interface element 303 can enable a user to record a video, upload a previously recorded video, and/or the like via the input user interface 308. In some examples, a recording can include a shared screen of the user. In some examples, actuating the user interface element 304 can enable a user to generate a message, upload a previously generated message, and/or the like via an input user interface.

In some examples, the input user interface 308 can enable the user to view content recorded prior to posting the content to the virtual space. In some examples, the input user interface 308 can be configured to use background noise suppression technology, content improvement technology (e.g., auto contrast, brightness, default filters, etc.), background blur and/or replacement technology, etc. In some examples, content can be uploaded while it is being recorded or otherwise captured (or immediately after recording or otherwise capturing) such that a creator can post the content when the creator has finished recording or otherwise capturing the content. Content generated, uploaded, and/or otherwise provided can be posted as a reply to the message (e.g., representative of the asynchronous meeting).

In at least one example, the input user interface 308 can include a user interface element 310 that can be associated with an actuation mechanism. Based at least in part on detecting actuation of the actuation mechanism, the application 140 can send the content generated via the input user interface 308 to the server(s) 102. In some examples, an attendee can reply via an input mechanism associated with the virtual space (e.g., the input mechanism 222), an input mechanism associated with the user interface element 300, and/or the like). In some examples, the user can upload audio and/or video content from a datastore (e.g., local, cloud-based, etc.). In examples where content is submitted via a mechanism other than an interaction with the user interface element 306, the user may provide an input to indicate which message, meeting, thread, etc. the content is to be associated with. As such, the meeting management component 116 can associate the correct identifier(s) with the content, which can be used for determining which message(s), meeting(s), thread(s), etc. the content is to be associated with.

As described above, in some examples, the meeting management component 116 can receive content from clients of the attendees. In some examples, the content can comprise text content, audio content, visual content (e.g., image content, video content, etc.), combinations of the foregoing, and/or the like. In some examples, individual of the attendees can reply with snippets of content, as described above. In at least one example, the meeting management component 116 can receive the content, associate the content with the meeting object associated with the asynchronous meeting, and can cause the content to be presented, in association with the message, via the user interface 200. In some examples, as items of content are received from individual users, the meeting management component 116 can associate the items of content with the asynchronous meeting and, in some examples, the items of content can correspond to a collection of content. Such a collection can correspond to the replies received from individual attendees. In some examples, the collection can comprise audio content, video content, image content, text content, combinations of the foregoing, and/or the like. In examples wherein content received comprises snippets of content, the meeting management component 116 can generate a collection of snippets of content.

Figure 3C:
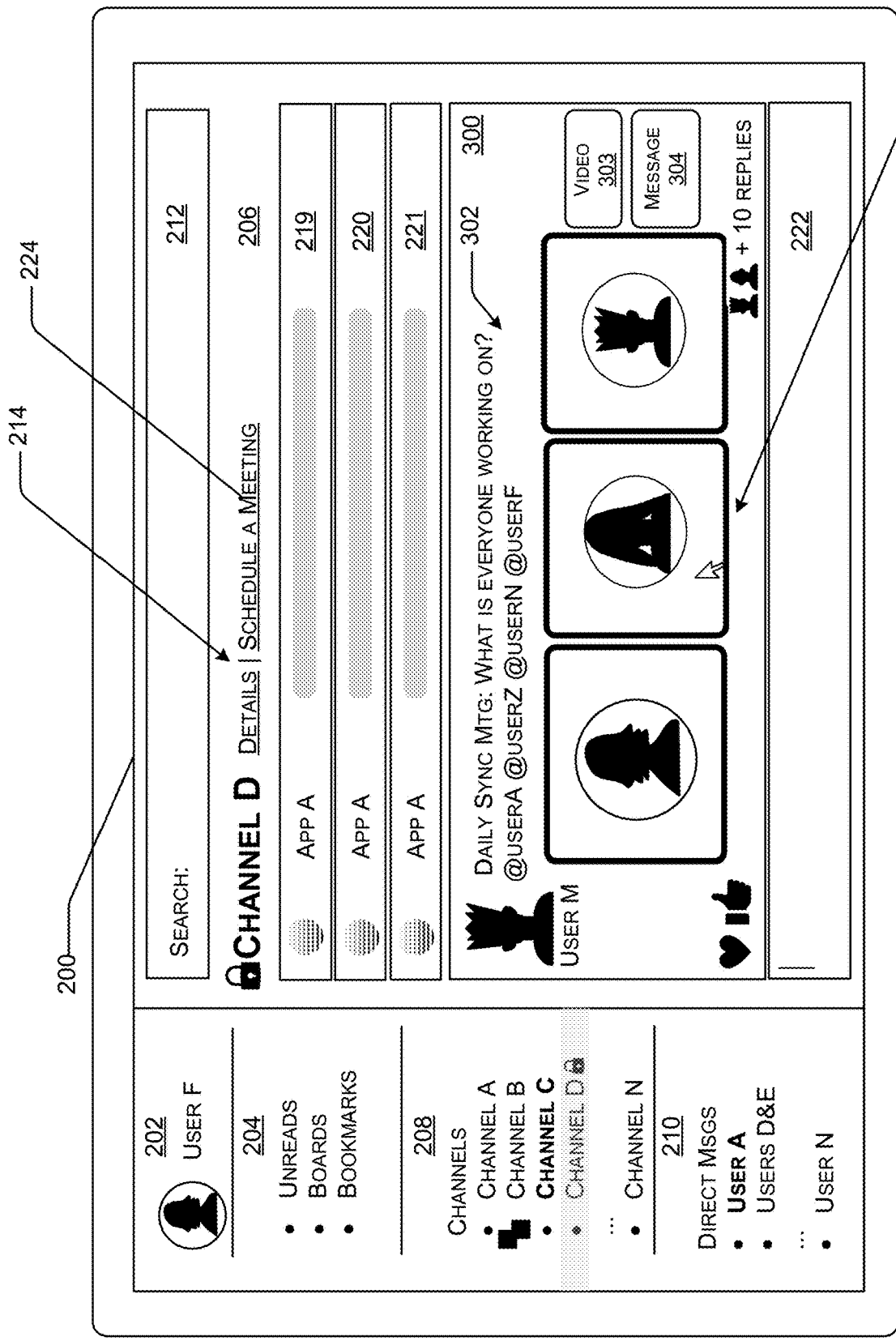
FIG. 3C illustrates another example of the user interface of FIG. 2A, wherein content provided by attendees of the meeting is presented in association with the user interface element representative of the asynchronous meeting.
Figure 3D:
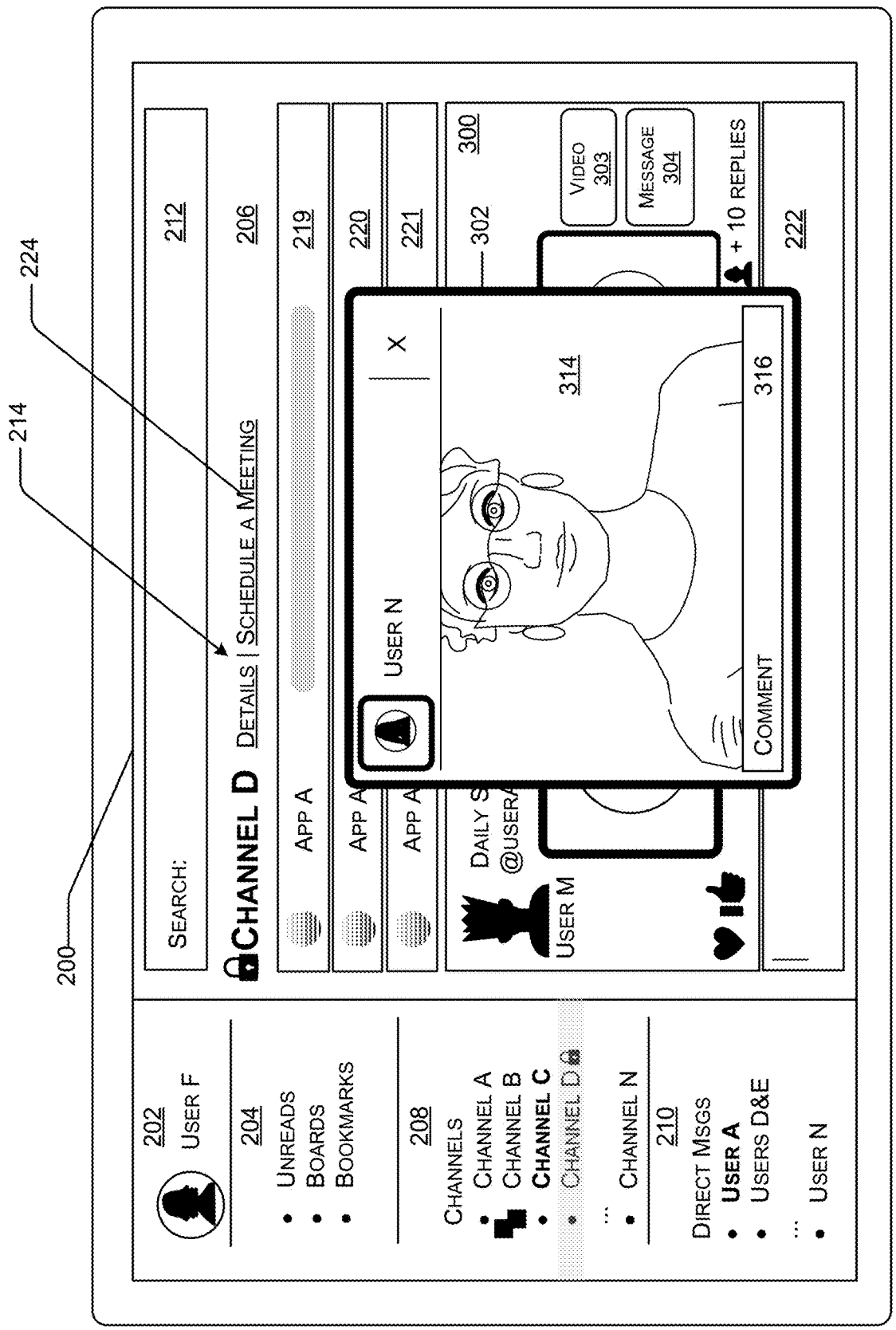
FIG. 3D illustrates another example of the user interface of FIG. 2A, wherein content provided by an attendee of the asynchronous meeting is presented via the user interface.

For example, as illustrated in FIG. 3C, the user interface element 300 is associated with additional user interface elements 312 representing snippets of content contributed by meeting attendees. In some examples, the additional user interface elements 312 can represent a preview summary of the collection of content. In some examples, the user interface elements 312 can be arranged in a tile configuration. In at least one example, each user interface element can be associated with an actuation mechanism that, when actuated, can cause a respective snippet of content associated with the user interface element to be presented via the user interface 200. That is, based at least in part on receiving an indication of an actuation of one of the user interface elements 312, the meeting management component 116 can cause the corresponding snippet of content to be presented via the user interface 200, as illustrated in FIG. 3D. In such an example, a user interface element 314 can be presented via the user interface 200.

In some examples, the user interface element 314 can be associated with a player and/or viewer functionality. In at least one example, the user interface element 314 can be interactable such that other users can reply (e.g., via an input to an input mechanism 316), an affordance associated with emojis or reactjis, etc. In some examples, based at least in part on causing a first snippet of content to be presented via the user interface 200, one or more other snippets of content can be presented serially without the user providing another input. That is, in some examples, the user can request to view one snippet of content (e.g., via interaction with a user interface element representative thereof) and one or more additional snippets of content can be presented without interruption. In some examples, this can cause a content thread and/or feed to be presented via the user interface 200. A user can view content, such as snippets of content, in a continuous thread and/or feed without having to scroll through a thread which can include combinations of content. In some examples, wherein a meeting is associated with multiple topics, each topic can be associated with its own content thread and/or feed.

In some examples, as illustrated in FIG. 3C, content associated with at least some of the replies associated with the meeting can be presented as content of the message. That is, in some examples, one or more replies can be presented inline with the message. In some examples, the content provided by individual of the attendees can be arranged based at least in part on their creation time, the time each is received or posted, topic, length, size, creator, etc. In some examples, content provided by attendees can be ephemeral (e.g., lasting for a short period of time) or not ephemeral (e.g., enduring or long-lived). In some examples, one or more of the replies can be arranged in a preview summary presented in association with the user interface element 300. For the purpose of this discussion, a "preview summary" can be a configuration of user interface elements, representative of one or more replies (e.g., and associated content) to a message representative of an asynchronous meeting. The user interface elements 312 are an example of such. In some examples, the meeting management component 116 can refrain from presenting a preview summary until more than a threshold number of replies have been received. In some examples, a user may automatically play all the snippets of content posted in association with the asynchronous meeting by selecting to play a particular snippet of content. Thereafter, the snippet of content following the selected snippet of content may be automatically played in sequence. In some examples, posted snippets of content may be displayed in association with the user interface element 300 in a tile view such that a preview is shown for one or more of the snippets of content associated with the message, as illustrated in FIG. 3C.

Figure 3E:
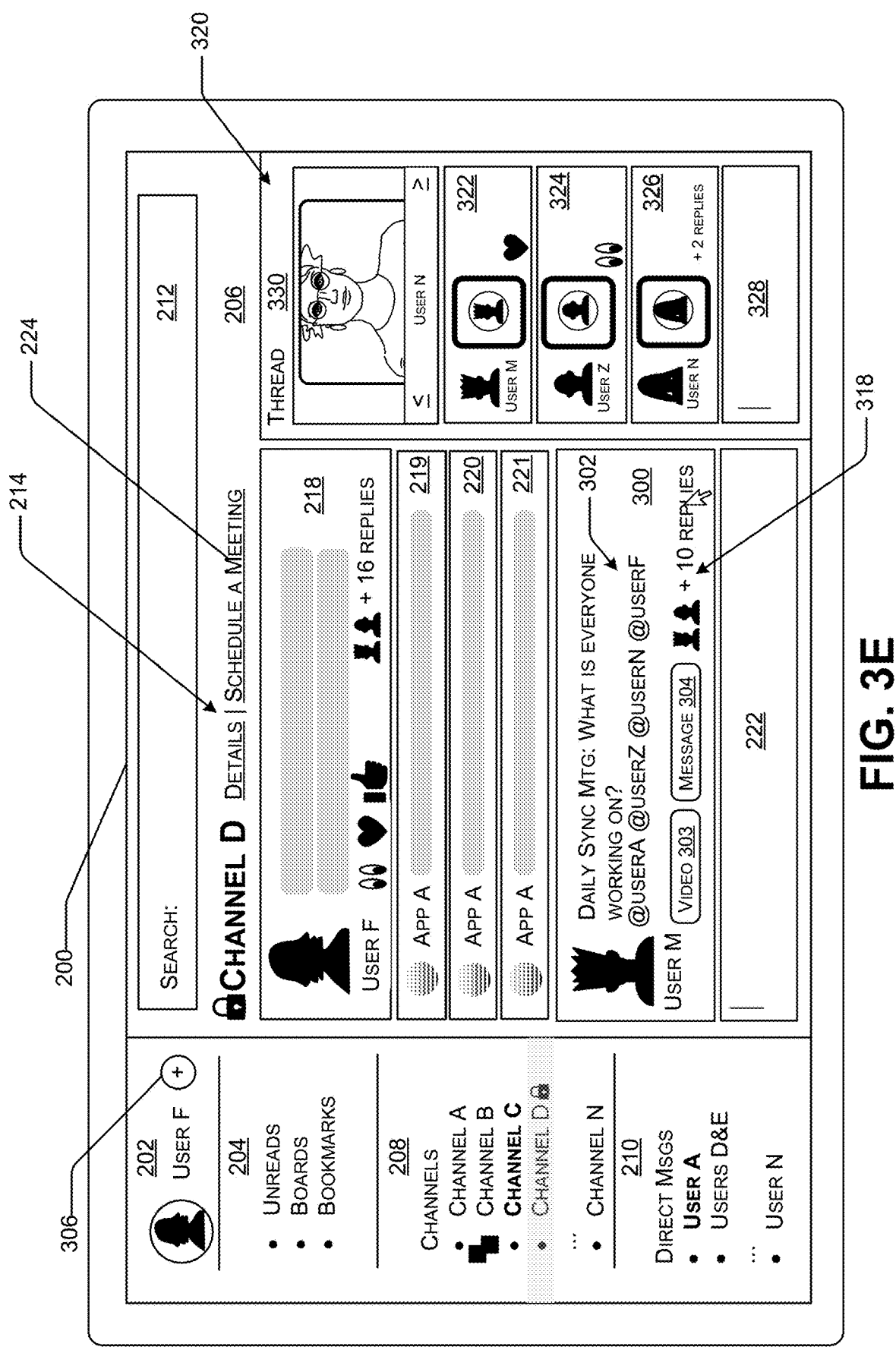
FIG. 3E illustrates another example of the user interface of FIG. 2A, wherein content provided by attendees of the meeting is presented in a thread associated with the user interface element representative of the asynchronous meeting.

In some examples, as illustrated in FIG. 3E, the message (i.e., associated with the asynchronous meeting) can be the parent message and each of the replies can be associated with the parent message are posted as part of the message thread and/or feed. In such examples, the parent message and each of the replies can be associated with a same thread identifier. As such, the replies can be associated with the same object as the parent message instead of with individual objects in the virtual space. In some examples, individual of the replies can be associated with a digest indicator, for example, indicating a number of replies, users who have responded, etc. In some examples, the digest indicator, which can be represented as a user interface element 318, can be associated with an actuation mechanism to cause the individual of replies to be presented via a user interface 200, as illustrated in FIG. 3E. For example, based at least in part on detecting actuation of the actuation mechanism associated with the user interface element 318, content associated with the asynchronous meeting can be presented via a new section or subsection associated with a "thread" 320. In some examples, the thread 320 can comprise one or more user interface elements 322, 324, 326, etc. that represent replies associated with the asynchronous meeting. In some examples, the replies can be associated with text content, audio content, video content, image content, combinations of the foregoing, etc. As such, the thread 320 can comprise a rich data thread. In some examples, the individual items of content associated with individual replies can be presented in a feed. In some examples, the thread 320 can be associated with an input mechanism 328 to enable users to add replies to the thread 320. In some examples, individual replies associated with the thread 320 can be presented via a new section or sub-section 330 of the user interface 200.

In some examples, a user can interact with a user interface element representative of a content item, such as a snippet of content, and the content item can be presented via the user interface 200, for example, in association with the new section or sub-section 330. In some examples, the content item can be presented via a user interface element that can be associated with a player and/or viewer functionality. In at least one example, the content can be interactable such that other users can reply (e.g., via an input to an input mechanism), an affordance associated with emojis or reactjis, etc. In some examples, a request to view a single content item can enable the user to view multiple of the content items associated with the thread. In some examples, the meeting management component 116 can cause individual content items to be presented sequentially without requiring further input from the user.

Figure 3F:
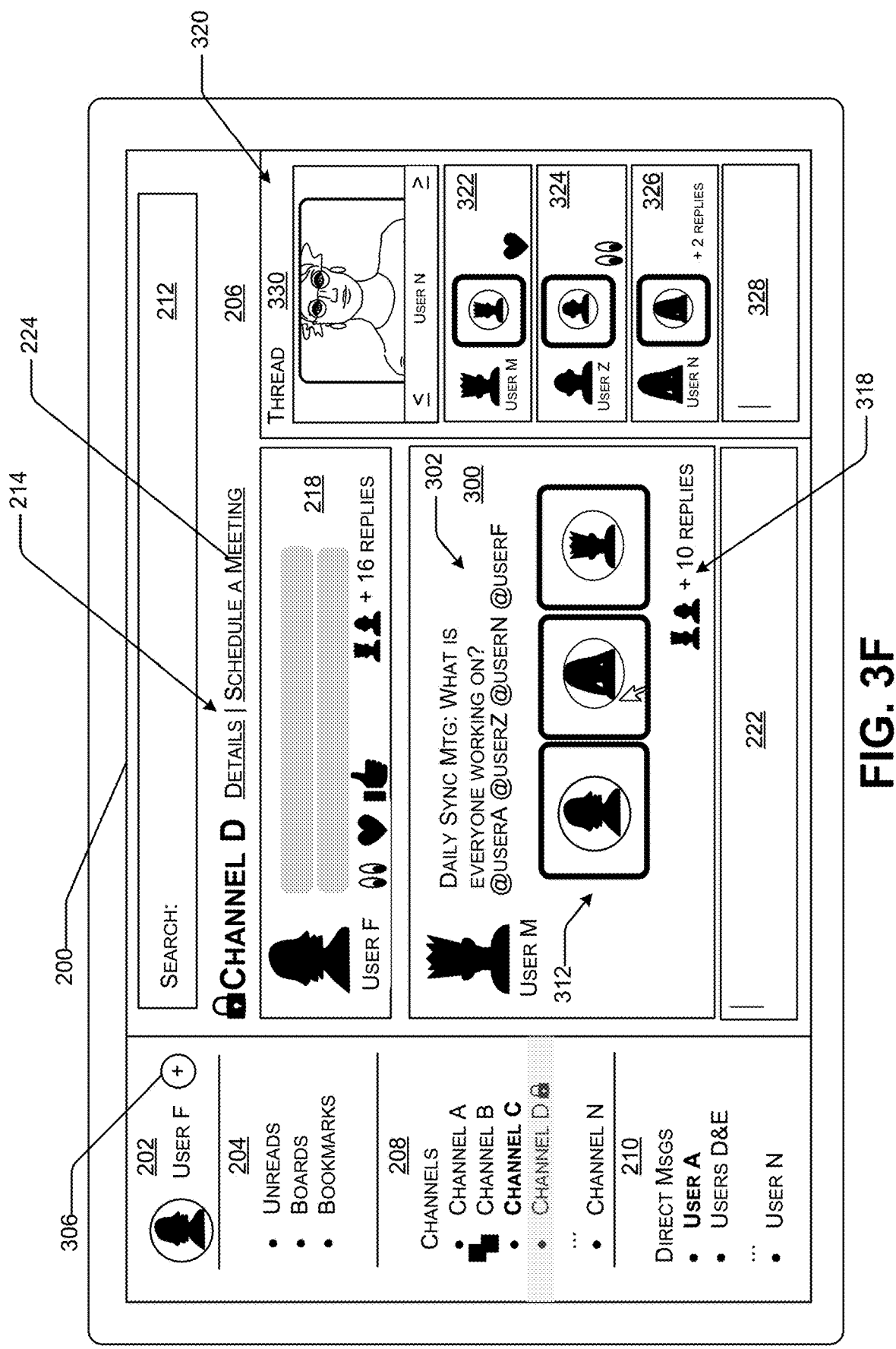
FIG. 3F illustrates another example of the user interface of FIG. 2A, wherein content provided by attendees of the meeting is presented in a tile preview summary and a thread associated with the user interface element representative of the asynchronous meeting.

In some examples, as illustrated in FIG. 3F, an aggregate summary of the replies is shown in a tile preview summary in the user interface element 300 representative of the parent message, where individual replies can be shown in separate tiles. In some examples, the tile preview summary can be displayed in the parent message with which the thread 320 is associated. In some examples, the digest indicator (e.g., represented by the user interface element 318), as described above, can include a count that shows the total number of replies that are in the thread. In some embodiments, a user may select one of the replies in the tile preview to start playing and/or otherwise presenting individual snippets of content associated with the set of replies. In some examples, a user may skip to any snippet of content in the set. In some examples, once a snippet of content is selected for playback, individual of the subsequent snippets of content in the thread 320 can be automatically played in sequential order. In some examples, selecting a particular snippet of content from the tile preview summary causes the corresponding snippet of content to play and also the corresponding message in the thread 320 to be displayed.

In some examples, a user interface element 300 representative of an asynchronous meeting can be presented via the user interface 200 and can be presented in a location that corresponds to the time the message is posted to the virtual space. In such examples, the user interface element 300 can move within the user interface 200 (e.g., the feed) as new messages are received. In other examples, the user interface element 300 representative of the asynchronous meeting can be pinned to a location associated with a virtual space such that it does not move as new messages are received. In some examples, the user interface element 300 can be pinned to the top of a channel or direct message, pinned to the bottom of a channel or direct message, and/or the like. In some examples, when a new reply is added to the message, the user interface element 300 can be presented as the newest in time message in the virtual space. In some examples, the meeting management component 116 can change the presentation of the user interface element 300 when a new reply is added, for example, by causing the user interface element 300 to be presented in a different color, with a change in font type, style, and/or size, with a different line weight, with an animation, with a badge, and/or the like.

While snippets of content are referenced above, replies, as described above can comprise text content, audio content, visual content (i.e., video content or image content), combinations of the foregoing or the like. That is, replies can be any type of single media or multimedia content. In some examples, replies can comprise snippets of content, as described above.

In some examples, a virtual space such as a channel, direct message, board, virtual meeting hub, and/or the like can support one or more asynchronous meetings in parallel. In at least one example, a channel can have a meeting associated with a check-in and a demo occurring at the same time. This is not available with conventional meeting technologies. In some examples, when a message associated with a meeting receives new content, the meeting management component 116 can cause the user interface element representative thereof (e.g., the user interface element 300 in FIGS. 3A-3F) to be presented with an indication that new content has been received. In some examples, the meeting management component 116 can update additional or alternative features of the user interface 200 to indicate that new content has been received (e.g., the header of the virtual space proximate virtual space details, in the first section of the user interface 200, etc.).

Figure 4:
FIG. 4 illustrates another example of the user interface of FIG. 2A, wherein one or more meetings with which a user is associated are accessible via the user interface.

In some examples, the communication platform can enable users to access meetings with which they are associated from a virtual space associated with meetings (e.g., a virtual meeting hub). That is, in some examples a virtual space can be associated with meetings that are associated with different channels, direct messages, boards, groups, and/or the like. An example of a virtual meeting hub is illustrated in FIG. 4. As illustrated in FIG. 4, the second section 206 of the user interface 200 can include one or more user interface elements 402 and 404. In at least one example, the user interface elements 402 and 404 can represent two different meetings, which can be associated with different channels, direct messages, boards, meeting organizers, attendees, etc. In at least one example, such meetings can be represented in a feed or other arrangement via the user interface 200. In some examples, meetings can comprise video meetings, audio meetings, meetings comprising mixed media, and/or the like. In some examples, meetings can be asynchronous (e.g., as described above) or synchronous (e.g., where individual users join an audio meeting at a same time).

In some examples, the user interface elements 402 and/or 404 can be associated with actuation mechanisms. When an actuation mechanism associated with a user interface element 402 or 404 is actuated (e.g., by a user), the meeting management component 116 can cause data associated with the virtual space with which the meeting is associated to be presented via the second section 206, wherein the data comprises at least a user interface element associated with the meeting corresponding to the user interface element 402 or 404. In such an example, the user can access content associated with the meeting via the user interface 200. For instance, based at least in part on a determination that the user interacted with the user interface element 402, the user interface 200 as illustrated and described in FIG. 3A can be presented via the client of the user.

In some examples, the user can access and/or interact with content associated with the meeting from the instance of the user interface 200 presented in FIG. 4. That is, the user can access and/or interact with individual items of content associated with the user interface elements 402 or 404 without navigating to the channel, direct message, board, etc. with which the meeting is associated. That is, the user interface 200 as illustrated in FIG. 4 can enable the user to view meetings with which they are associated (e.g., as a meeting organizer and/or attendee) via a single access point (e.g., a "hub").

FIGS. 1-4 make reference to "user interface elements." A user interface element can be any element of the user interface that is representative of an object, message object, virtual space, and/or the like. A user interface element can be a text element, a graphical element, a picture, a logo, a symbol, and/or the like. In some examples, a user interface element can be presented as a pop-up, overlay, new sections of the user interface 200, a new user interface, part of another user interface element, and/or the like. In at least one example, individual of the user interface elements can be associated with actuation mechanisms. Such actuation mechanisms can make the corresponding user interface elements selectable or otherwise interactable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102. In some examples, the server(s) 102 can send data and/or instructions to the application 140 to generate new user interfaces and/or update the user interface 200, as described herein.

The example user interfaces and user interface elements described above are provided for illustrative purposes. In some examples, such user interfaces and user interface elements can include additional or alternative data, which can be presented in additional or alternative configurations. That is, the user interfaces and user interface elements should not be construed as limiting.

Figure 5:
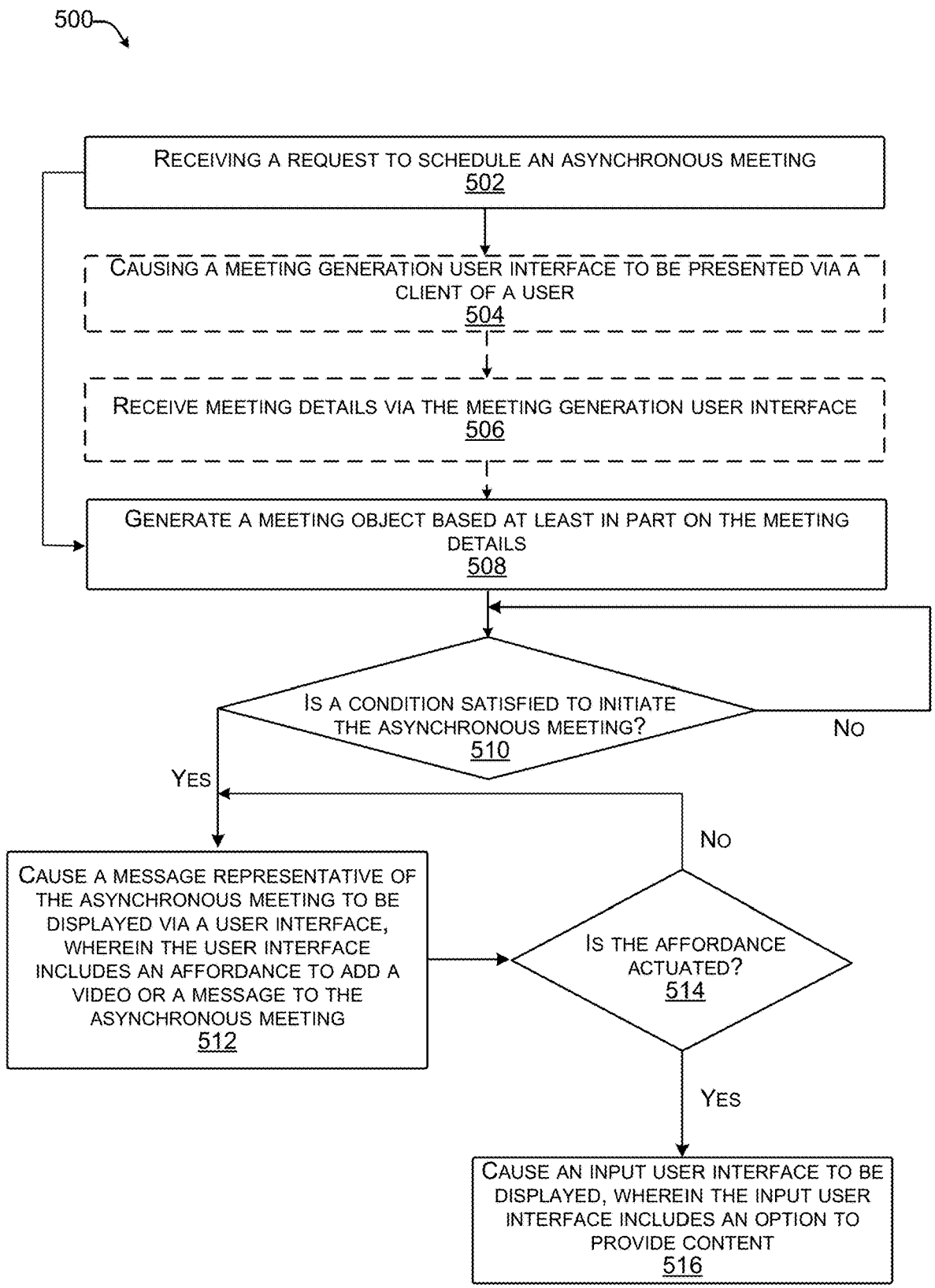
FIG. 5 illustrates an example process for causing a message representative of an asynchronous meeting to be displayed via a user interface of a communication platform, as described herein.
Figure 6:
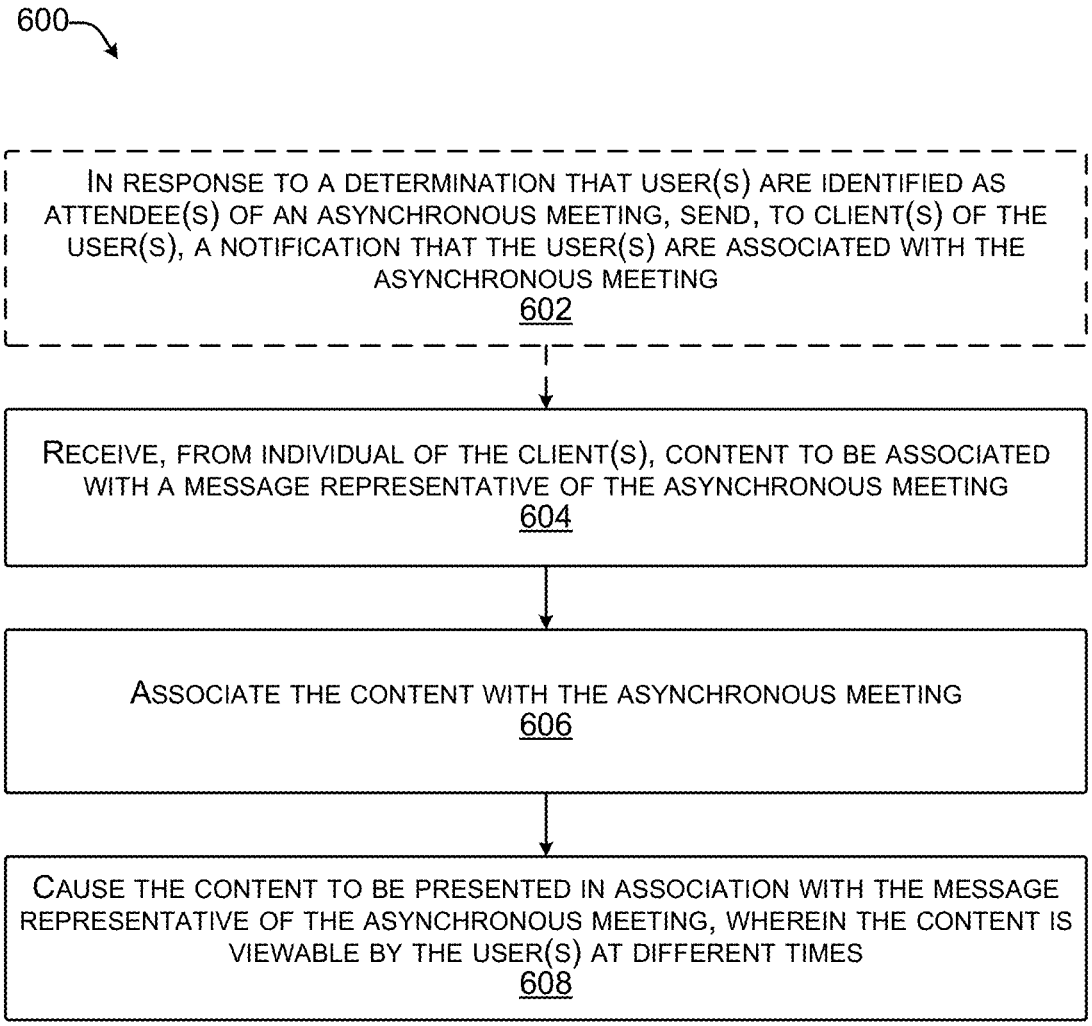
FIG. 6 illustrates an example process for causing content to be presented in association with a message representative of an asynchronous meeting that is displayed via a user interface of a communication platform, as described herein.
Figure 7:
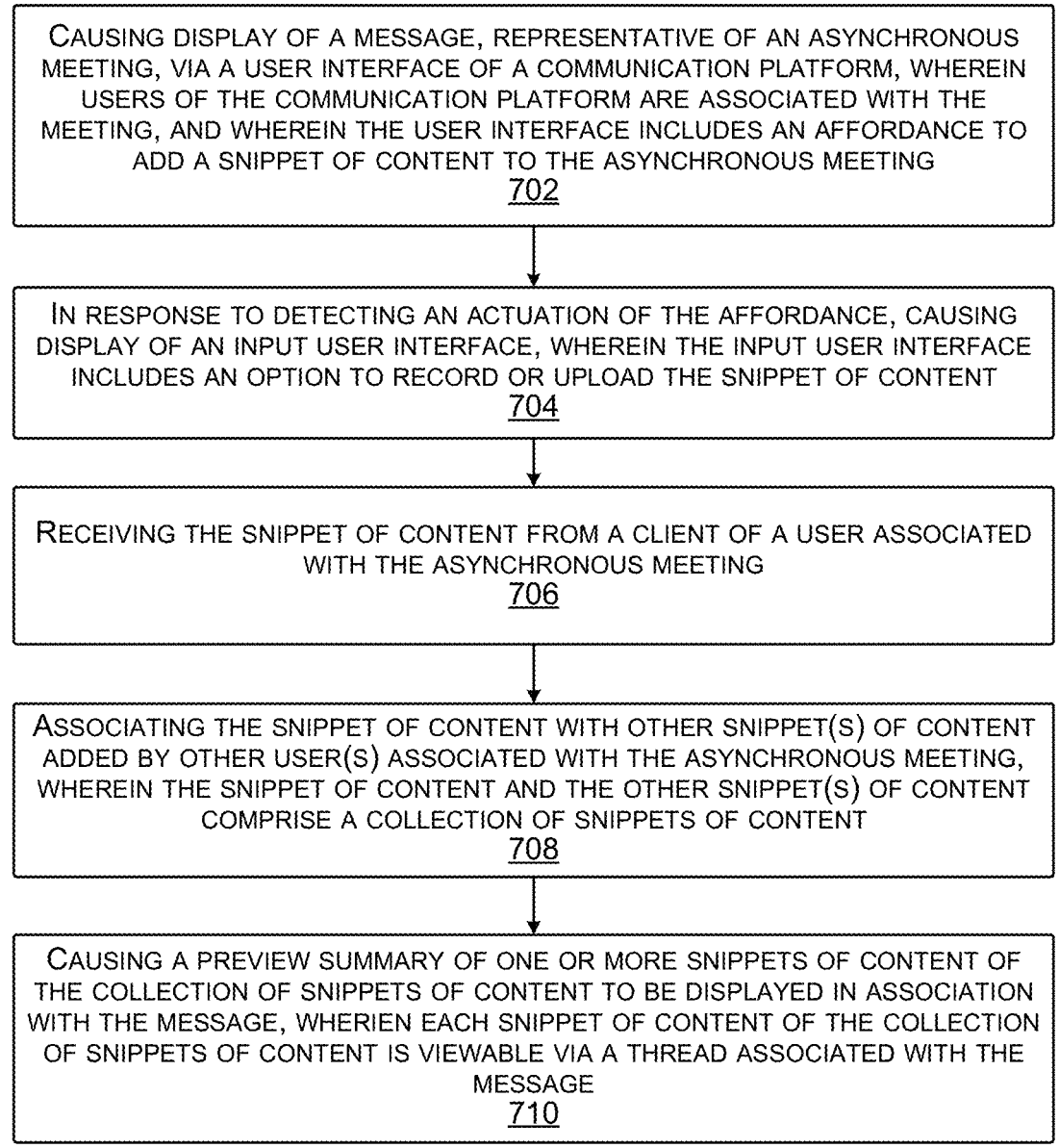
FIG. 7 illustrates an example process for facilitating an asynchronous meeting, as described herein.

FIGS. 5-7 are flowcharts showing example processes involving techniques as described herein. The processes illustrated in FIGS. 5-7 are described with reference to components of the environment 100 shown in FIG. 1 for convenience and ease of understanding. However, the processes illustrated in FIGS. 5-7 are not limited to being performed using the components described above with reference to the environment 100. Moreover, the components described above with reference to the environment 100 are not limited to performing the processes illustrated in FIGS. 5-7.

The processes in FIGS. 5-7 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, message objects, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 5-7 can be combined in whole or in part with each other or with other processes.

FIG. 5 illustrates an example process 500 for causing a message representative of an asynchronous meeting to be displayed via a user interface of a communication platform, as described herein.

At operation 502, the meeting management component 116 can receive a request to schedule an asynchronous meeting. In some examples, such a request can be received from a client of a meeting organizer. In at least one example, the meeting management component 116 can cause an affordance for generating an asynchronous meeting to be presented via a user interface associated with a communication platform. An example of such an affordance is provided in FIG. 2A, above. In at least one example, the meeting management component 116 can receive an indication of an interaction with the affordance which can be associated with a request to generate and/or otherwise initiate an asynchronous meeting.

At operation 504, which can be optional, the meeting management component 116 can cause a meeting generation user interface to be presented via a client of a user. In at least one example, the meeting management component 116 can cause a meeting generation user interface to be presented via the user interface of the communication platform. In some examples, the meeting generation user interface can be a pop-up, overlay, or other user interface element presented via the user interface of the communication platform. In some examples, the meeting generation user interface can take over the user interface of the communication platform or comprise a new user interface. An example of such a meeting generation user interface is provided in FIG. 2B, above.

At operation 506, which can be optional, the meeting management component 116 can receive meeting details via the meeting generation user interface. In at least one example, the meeting generation user interface can include one or more user interface elements which guide a first user (e.g., the meeting organizer) to input meeting details. Meeting details can include a title and/or topic of an asynchronous meeting, a date of the asynchronous meeting, a time of the asynchronous meeting, a recurrence of the asynchronous meeting, a description of the asynchronous meeting, attendees of the asynchronous meeting, and/or other meeting details. In at least one example, an asynchronous meeting can be recurring such that it recurs at a designated frequency, such as hourly, daily, weekly, monthly, etc. In some examples, the meeting configuration user interface can enable a link, a file, or other object to be associated with the asynchronous meeting.

In some examples, the first user can tag one or more second users (e.g., meeting attendees) in the message. In some examples, such a tag can be an "invitation" to join a meeting. In some examples, the first user can identify the one or more second users via an input to the message generation user interface. In some examples, the first user can tag a second user via a mention, a profile view, an email, or generating a link from the meeting generation interface that enables a second user to be added to the asynchronous meeting. In at least one example, the meeting management component 116 can associate one or more second user identifiers associated with the one or more second users with the asynchronous meeting.

In some examples, the meeting management component 116 can utilize context data associated with the meeting generation request to generate recommendations for meeting details. In some examples, based at least in part on receiving a request to generate an asynchronous meeting, the meeting management component 116 can access content data to recommend meeting details. For example, the meeting management component 116 can access data associated with a virtual space from which the request to generate was received and can recommend meeting details based at least in part on such data. For instance, the meeting management component 116 can identify a common topic discussed in previous messages associated with the virtual space and can recommend the topic for the meeting topic. In some examples, such topics can be identified based at least in part on recency (e.g., close in time to when the meeting generation request is received), frequency (e.g., occurrence in the virtual space), etc. In some examples, the meeting management component 116 can recommend users to add as meeting attendees based at least in part on members of the virtual space from which the request to generate the meeting was received. In some examples, recommended attendees can be based at least in part on users with which the meeting organizer frequently interacts (e.g., above a threshold or relative to other members of the virtual space). In some examples, recommendations for meeting details can be based at least in part on data associated with the communication platform, such that topics can be identified based at least in part on topics commonly used for meetings across users, virtual spaces, groups, etc.

In some examples, the process 500 can proceed from operation 502 to operation 508 without generating an asynchronous meeting via a meeting generation user interface. In such examples, an asynchronous meeting can be generated via an alternative mechanism as described above. In such examples, meeting details can be provided via an alternative input mechanism.

At operation 508, the meeting management component 116 can generate a meeting object based at least in part on the meeting details. In some examples, meetings, regardless of how they are scheduled, can be associated with an object that is stored in the datastore 122. Such an object can be a meeting object, which can be associated with a meeting identifier. In at least one example, based at least in part on receiving data input into the meeting generation user interface, the meeting management component 116 can receive such data and can generate a meeting object for the asynchronous meeting.

In at least one example, the message object can be associated with a meeting identifier, one or more user identifiers (e.g., indicating the attendee(s) of the meeting), an originating user identifier (e.g., indicating the message originator), one or more invitee user identifier(s), identifier(s) of virtual space(s) to which the message is to be posted, content associated with the message (e.g., prior to the start of the meeting), metadata associated with meeting details, etc. In at least one example, the message can be associated with identifier(s) of virtual space(s) such that each time the virtual space is presented via the user interface of the communication platform, the message is presented (so long as it is in view). In at least one example, the message can be associated with at least one thread identifier (which, in some examples, can be a meeting identifier).

At operation 510, the meeting management component 116 can determine whether a condition is satisfied such to initiate the asynchronous meeting. In some examples, meetings can be generated ad hoc such that the first user can generate a meeting via the meeting generation user interface and the meeting management component 116 can post a message associated with the meeting to a virtual space, such as a channel, a direct message, a board, a virtual meeting hub, etc. as soon as the meeting is generated. Such meetings can be "one-off" meetings or an initial meeting of a set of recurring meetings. In some examples, such meetings can be associated with a condition, wherein the condition is that user input has been provided to cause the message to be posted to a virtual space.

In some examples, asynchronous meetings can be scheduled such that the first user can generate an asynchronous meeting via the meeting generation user interface at a first time and the meeting management component 116 can post a message associated with the asynchronous meeting to a virtual space at a second, later time. In some examples, scheduled asynchronous meetings can be associated with reminders, workflows, bots, and/or the like. In some examples, scheduled asynchronous meetings can be posted automatically by the meeting management component 116 in response to a determination that a current date and/or time corresponds to a date and/or time associated with the scheduled asynchronous meeting or that another condition associated with the asynchronous meeting is satisfied. As described above, asynchronous meetings can be associated with objects for storage in the datastore 122. In some examples, meeting objects can be associated with metadata indicating meeting details. In some examples, scheduled asynchronous meetings can be recurring meetings. In some examples, meeting details associated with meeting objects can be used to determine whether a condition is satisfied.

Based at least in part on determining that the condition is satisfied (i.e., "yes" at operation 510), the meeting management component 116 can cause a message representative of the asynchronous meeting to be displayed via a user interface. In some examples, the user interface can include an affordance to add a video or a message to the asynchronous meeting. As described above, a message associated with an asynchronous meeting can be presented based at least in part on detecting satisfaction of a condition associated with the asynchronous meeting (e.g., a current date and/or time corresponds to a date and/or time associated with an asynchronous meeting, context, etc.). In some examples, metadata associated with meeting details of the asynchronous meeting can be analyzed by the meeting management component 116 to determine whether a condition is satisfied. Based at least in part on determining satisfaction of a condition associated with an asynchronous meeting, the meeting management component 116 can cause a message representative of the asynchronous meeting to be presented in a virtual space associated with the communication platform. As described above, the virtual space can be a channel, a direct message, a board, a virtual meeting hub, and/or the like. In at least one example, the message associated with the asynchronous meeting is viewable by each member of the virtual space (e.g., each user permissioned to access the virtual space). In some examples, the message is viewable by fewer than all members of the virtual space. In at least one example, if the request is associated with meeting details, a link, a file, or other object, the message, when presented via the user interface, can be associated with the meeting details, the link, the file, or the other object. In at least one example, each of the second user(s) can be tagged or otherwise identified in the message when presented via the user interface. In some examples, the message associated with the asynchronous meeting can be associated with content provided by the first user (e.g., the meeting creator). An example of a message representative of an asynchronous meeting that is displayed via a user interface of the communication platform is described above with reference to FIG. 3A. In some examples, the meeting management component 116 can send a notification to clients of attendees of the asynchronous meeting to prompt the attendees to provide content (i.e., participate in the asynchronous meeting), additional details are provided below with reference to FIG. 6.

In at least one example, the user interface can include an affordance to add a video or message to the asynchronous meeting. In some examples, such an affordance (or affordances) can be associated with the message itself as presented via the user interface, as illustrated above with reference to FIG. 3A. In at least one example, the meeting management component 116 can determine whether the affordance has been actuated, as illustrated at operation 514. In at least one example, based at least in part on determining that the affordance has been actuated (i.e., "yes" at operation 514), the meeting management component 116 can cause an input user interface to be displayed, wherein the input user interface includes an option to provide content, as illustrated at operation 516. In at least one example, the meeting management component 116 can cause an input user interface to be presented via an instance of the user interface associated with the user that interacted with the affordance. In at least one example, the user can upload or generate content. For instance, a user can upload or record a video, upload or compose a message, etc. An example of such an input user interface is provided above with reference to FIG. 3B.

In at least one example, content can be received via the input user interface and associated with other content received from other attendees of the asynchronous meeting. That is, the meeting management component 116 can receive content items, which can be associated with replies, from attendees of the asynchronous meeting, associate the content items with the asynchronous meeting, and cause the content items to be displayed, in association with the message, via the user interface of the communication platform. In some examples, as described above, the content items can be aggregated into a collection of content items and a preview summary of one or more content items of the collection of content items can be displayed, in association with the message, via the user interface. In some examples, each of the content items can be viewable via a thread and/or feed association with the message. And, as described above, each of the content items can be independently interactable.

In at least one example, the meeting management component 116 can determine that the affordance has not been actuated (i.e., "no" at operation 514) and, in such an example, the process 500 can return to operation 512.

Based at least in part on determining that the condition is not satisfied (i.e., "no" at operation 510), the process 500 can return to operation 510 and await until the condition is satisfied to cause the message representative of the asynchronous meeting to be displayed via the user interface.

FIG. 6 illustrates an example process 600 for causing content to be presented via a message representative of an asynchronous meeting that is displayed via a user interface of a communication platform, as described herein.

At operation 602, which can be optional, in response to a determination that user(s) are identified as attendee(s) of an asynchronous meeting, the meeting management component 116 can send, to client(s) of the user(s), a notification that the user(s) are associated with the asynchronous meeting. As described above, a first user (e.g., a meeting organizer) can tag one or more second users (e.g., meeting attendees) in a message. In some examples, such a tag can be an "invitation" to join a meeting. In some examples, the first user can identify the one or more second users via an input to a message generation user interface. In some examples, the first user can tag a second user via a mention, a profile view, an email, or generating a link from the meeting generation interface that enables a second user to be added to the asynchronous meeting. In at least one example, the meeting management component 116 can associate one or more second user identifiers associated with the one or more second users with the asynchronous meeting. Based at least in part on a determination that the second user(s) are identified as attendee(s), the meeting management component 116 can send, to client(s) of the second user(s), a notification that the second user(s) are associated with the asynchronous meeting. In at least one example, the notification can prompt or otherwise request the second user(s) to provide content for association with the message.

In some examples, a notification sent to each of the attendees can cause a user interface element to be presented via an instance of the user interface presented via the respective clients. An example of such a user interface element is provided above with reference to FIG. 3B. In some examples, the notification can prompt each of the attendees to post a reply to the message (i.e., participate in the asynchronous meeting).

At operation 604, the meeting management component 116 can receive, from individual of the client(s), content to be associated with a message representative of the asynchronous meeting. In some examples, the notification can prompt each of the attendees to post a reply to the message (i.e., participate in the asynchronous meeting). In some examples, the meeting management component 116 can receive content from clients of the attendees. In some examples, the content can comprise text, audio content, visual content (e.g., image content and/or video content), combinations of the foregoing, and/or the like. In some examples, individual of the attendees can reply with snippets of content, as described above. In some examples, the content can be associated with a meeting identifier, a message identifier, a thread identifier, and/or the like. As such, in at least one example, the meeting management component 116 can utilize the meeting identifier, message identifier, thread identifier, and/or the like associated with the content to associate the content with the correct meeting, message, thread, etc. That is, the meeting management component 116 can associate the content with the asynchronous meeting, as illustrated at operation 606.

At operation 608, the meeting management component 116 can cause the content to be presented in association with the message representative of the asynchronous meeting, wherein the content is viewable by the user(s) at different times. In at least one example, the meeting management component 116 can receive the content and can cause the content to be presented, in association with the message, via the user interface. In some examples, as illustrated in FIG. 3C, above, content associated with at least some of the replies associated with the asynchronous meeting can be presented as content of the message. That is, in some examples, one or more replies can be presented inline with the message. In some examples, the content provided by individual of the attendees can be arranged based at least in part on their creation time, the time each is received or posted, topic, length, size, creator, etc. In some examples, content provided by attendees can be ephemeral (e.g., lasting for a short period of time) or not ephemeral (e.g., enduring or long-lived). In some examples, one or more of the replies can be presented in a tile preview summary associated with the content of the message.

In some examples, as illustrated in FIG. 3E, above, the message (i.e., associated with the meeting) can be a "parent" message and each of the replies can be associated with the parent message as a thread. In such examples, the parent message and each of the replies can be associated with a same thread identifier. As such, the replies can be associated with the same object as the parent message instead of with individual objects in the virtual space. In some examples, individual of the replies can be associated with a digest indicator, for example, indicating a number of replies, users who have responded, etc. In some examples, the digest indicator can be associated with an actuation mechanism to cause the individual replies to be presented via a user interface, as illustrated in FIG. 3E or 3F. In some examples, the individual replies can be presented via the user interface in response to a user actuating or otherwise selecting a user interface element representative of a reply in a tile preview summary.

In at least one example, when the content is presented via the user interface, it can be represented by one or more user interface elements. Each of the user interface elements can be associated with an actuation mechanism that, when actuated, can cause the respective content associated with the user interface element to be presented via the user interface. That is, based at least in part on detecting actuation of one of the user interface elements, the meeting management component 116 can retrieve the content (e.g., from the datastore 122) and can cause the content to be displayed via the user interface. An example of such is illustrated in FIG. 3D, above. In some examples, content can be presented via a user interface element that can be associated with a player and/or viewer functionality. In at least one example, the content can be interactable such that other users can reply (e.g., via an input to an input mechanism), an affordance associated with emojis or reactjis, etc.

In some examples, based at least in part on causing first content to be presented via the user interface, other content (e.g., associated with the same thread identifier, meeting identifier, and/or message identifier) can be presented serially without the user providing another input. That is, in some examples, the user can request to view one snippet of content (e.g., via interaction with a user interface element representative thereof) and one or more additional snippets of content can be presented without interruption. In some examples, this can cause a content thread and/or feed to be presented via the user interface, wherein the content thread and/or feed represents an asynchronous meeting. That is, a first snippet of content can be presented via the user interface and one or more other snippets of content associated with replies can be presented serially without additional input from the user. In some examples, a user can provide one or more inputs to skip individual snippets of content, move to a particular snippet of content, go back to a previously viewed snippet of content, or the like. Such a viewing mechanism can enable users to view snippets of content without scrolling through individual replies in a message thread, which may contain a combination of videos, images, text, and/or the like. In some examples, meetings with multiple topics can be associated with multiple story threads.

FIGS. 5 and 6 relate to example processes for setting up an asynchronous meeting (e.g., FIG. 5) and/or obtaining content associated with an asynchronous meeting (e.g., FIG. 6), which are each components of facilitating an asynchronous meeting. FIG. 7 illustrates another example process 700 for facilitating an asynchronous meeting, as described herein.

At operation 702, the meeting management component 116 can cause display of a message, representative of an asynchronous meeting, via a user interface of the communication platform, wherein users of the communication platform are associated with the meeting, and wherein the user interface includes an affordance to add a snippet of content to the asynchronous meeting. As described above, in at least one example, the meeting management component 116 can cause a message representative of the asynchronous meeting to be displayed via a user interface. In some examples, the user interface can include an affordance to add a video or a message to the asynchronous meeting. In some examples, such an affordance (or affordances) can be associated with the message itself as presented via the user interface, as illustrated above with reference to FIG. 3A.

At operation 704, in response to detecting an actuation of the affordance, the meeting management component 116 can cause display of an input user interface, wherein the input user interface includes an option to record or upload the snippet of content to add to the asynchronous meeting. In at least one example, based at least in part on determining that the affordance has been actuated, the meeting management component 116 can cause an input user interface to be displayed, wherein the input user interface includes an option to provide content. In at least one example, the meeting management component 116 can cause an input user interface to be presented via an instance of the user interface associated with the user that interacted with the affordance. In at least one example, the user can upload or generate content. For instance, a user can upload or record a video, upload or compose a message, etc. An example of such an input user interface is provided above with reference to FIG. 3B.

At operation 706, the meeting management component 116 can receive the snippet of content from a client of a user associated with the asynchronous meeting. In at least one example, content can be received via the input user interface. That is, the meeting management component 116 can receive text content audio content, visual content (e.g., video content, image content, etc.), combinations of the foregoing, and/or the like. In at least one example, the content can comprise a snippet of content.

At operation 708, the meeting management component 116 can associate the snippet of content with one or more other snippets of content added by one or more other users associated with the asynchronous meeting, wherein the snippet of content and the one or more other snippets of content comprise a collection of snippets of content. In at least one example, content received via the input user interface can be associated with other content received from other attendees of the asynchronous meeting. That is, the meeting management component 116 can receive content items, which can be associated with replies, from attendees of the asynchronous meeting and associate the content items with the asynchronous meeting. In some examples, as described above, the content items can be aggregated into a collection of content items. In examples where such content comprises snippets of content, the collection of content items can comprise a collection of snippets of content.

At operation 710, the meeting management component 116 can cause a preview summary of one or more snippets of content of the collection of snippets of content to be displayed in association with the message, wherein each snippet of content of the collection of snippets of content is viewable via a thread associated with the message. In at least one example, the meeting management component 116 can receive the content, which can be snippets of content, and can cause the content to be presented, in association with the message, via the user interface. In some examples, as illustrated in FIG. 3C, above, content associated with at least some of the replies associated with the asynchronous meeting can be presented as content of the message. That is, in some examples, one or more replies can be presented inline with the message. In some examples, the content provided by individual of the attendees can be arranged based at least in part on their creation time, the time each is received or posted, topic, length, size, creator, etc. In some examples, content provided by attendees can be ephemeral (e.g., lasting for a short period of time) or not ephemeral (e.g., enduring or long-lived). In some examples, one or more of the replies can be presented in a tile preview summary associated with the content of the message.

In some examples, as illustrated in FIG. 3E, above, the message (i.e., associated with the meeting) can be a "parent" message and each of the replies can be associated with the parent message as a thread. In such examples, the parent message and each of the replies can be associated with a same thread identifier. As such, the replies can be associated with the same object as the parent message instead of with individual objects in the virtual space. In some examples, individual of the replies can be associated with a digest indicator, for example, indicating a number of replies, users who have responded, etc. In some examples, the digest indicator can be associated with an actuation mechanism to cause the individual replies to be presented via a user interface, as illustrated in FIG. 3E or 3F. In some examples, the individual replies can be presented via the user interface in response to a user actuating or otherwise selecting a user interface element representative of a reply in a tile preview summary.

In at least one example, when the content is presented via the user interface, it can be represented by one or more user interface elements. Each of the user interface elements can be associated with an actuation mechanism that, when actuated, can cause the respective content associated with the user interface element to be presented via the user interface. That is, based at least in part on detecting actuation of one of the user interface elements, the meeting management component 116 can retrieve the content (e.g., from the datastore 122) and can cause the content to be displayed via the user interface. An example of such is illustrated in FIG. 3D, above. In some examples, content can be presented via a user interface element that can be associated with a player and/or viewer functionality. In at least one example, the content can be interactable such that other users can reply (e.g., via an input to an input mechanism), an affordance associated with emojis or reactjis, etc.

In some examples, based at least in part on causing first content to be presented via the user interface, other content (e.g., associated with the same thread identifier, meeting identifier, and/or message identifier) can be presented serially without the user providing another input. That is, in some examples, the user can request to view one snippet of content (e.g., via interaction with a user interface element representative thereof) and one or more additional snippets of content can be presented without interruption. In some examples, this can cause a content thread and/or feed to be presented via the user interface, wherein the content thread and/or feed represents an asynchronous meeting. That is, a first snippet of content can be presented via the user interface and one or more other snippets of content associated with replies can be presented serially without additional input from the user. In some examples, a user can provide one or more inputs to skip individual snippets of content, move to a particular snippet of content, go back to a previously viewed snippet of content, or the like. Such a viewing mechanism can enable users to view snippets of content without scrolling through individual replies in a message thread, which may contain a combination of videos, images, text, and/or the like. In some examples, meetings with multiple topics can be associated with multiple story threads.

While FIG. 7 relates to snippets of content, the process 700 can be applicable for any type of content received in association with an asynchronous meeting.

FIGS. 1-7 illustrate systems and/or methods that enable the combination of audio content, visual content (e.g., image content, video content, etc.), and/or text content to be associated with a rich thread of a message. The integration of audio, visual, and/or text into a rich thread, enables users associated with the message and/or thread to receive updates asynchronously. As stated above, there are challenges with conventional, synchronous meetings. That is, with existing technology, if a meeting attendee cannot attend a meeting due to a conflict, they miss out on the information shared during the meeting, regardless of whether the meeting is held virtually or in-person. To the extent absent attendees are able to receive a meeting update after the meeting concludes (from a present attendee), such a summary may not be accurate, and the absent attendees may still miss some of the information shared during the meeting. As such, techniques described herein enable users to participate in asynchronous meetings such that attendees can post content and consume (i.e., view and/or interact with) content on their own time, in their own locations. That is, techniques described herein improve technology by creating a virtual space for asynchronous collaboration via a communication platform.

While techniques described herein can provide an unconventional mechanism for hosting and/or participating in a meeting, techniques described herein can improve computing devices and/or technology associated with communication platforms. For example, scheduling meetings with multiple attendees can be incredibly burdensome. Multiple communications—emails, text messages, messages via a communication platform, etc.—can be exchanged to determine a best time for a meeting. Then, many times, after a meeting is scheduled, one or more additional communications are exchanged due to scheduling conflicts that require rescheduling, etc. That is, scheduling meetings often consumes computing resources and causes network congestion. Techniques described herein alleviate such concerns and therefore offer improvements to computing devices and/or technology. That is, enabling asynchronous meetings via a communication platform alleviates the need to exchange communications to schedule, reschedule, etc. meetings. Therefore, techniques described herein enable the conservation of computing resources and decongestion of networks.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. A method, implemented by at least one computing device of a communication platform, comprising: causing display of a message, representative of an asynchronous meeting, via a user interface of the communication platform, wherein users of the communication platform are associated with the asynchronous meeting, and wherein the user interface includes an affordance to add a snippet of content to the asynchronous meeting; in response to detecting an actuation of the affordance, causing display of an input user interface, wherein the input user interface includes an option to record or upload the snippet of content to add to the asynchronous meeting; receiving the snippet of content from a client of a user associated with the asynchronous meeting; associating the snippet of content with one or more other snippets of content added by one or more other users associated with the asynchronous meeting, wherein the snippet of content and the one or more other snippets of content comprise a collection of snippets of content; and causing a preview summary of one or more snippets of content of the collection of snippets of content to be displayed in association with the message, wherein each snippet of content of the collection of snippets of content is viewable via a thread associated with the message.

B. The method of paragraph A, wherein the asynchronous meeting is associated with a meeting object stored in association with a datastore of the communication platform, and wherein the meeting object is associated with metadata indicating a date and a time of the asynchronous meeting, the method further comprising causing the display of the message based at least in part on the date and the time.

C. The method of paragraph A or B, wherein the users are associated with two or more organizations.

D. The method of any of claims A-C, wherein the client is a first client of a first user of the users and wherein the snippet of content is a first snippet of content, the method further comprising: receiving, at a first time and from a second client of a second user of the users, a first request to view at least a second snippet of content of the collection of snippets of content; in response to receiving the first request, causing at least the second snippet of content to be displayed via the second client; receiving, at a second time and from a third client of a third user of the users, a second request to view at least a third snippet of content of the collection of snippets of content; in response to receiving the second request, causing at least the third snippet of content to be displayed via the third client.

E. The method of any of claims A-D, wherein the snippets of content are presented in a thread of the message, and wherein each snippet of content is independently interactable.

F. The method of any of claims A-E, further comprising: tracking interaction data with individual snippets of content of the collection of snippets of content, wherein the interaction data indicates at least one of a number of reactions per snippet of content or a number of times each snippet of content of the collection of snippets of content has been viewed; and causing an indication of the interaction data to be presented via the user interface.

G. The method of any of claims A-F, wherein the preview summary comprises one or more tiles representative of the one or more snippets of content.

H. A system comprising: one or more processors; and one or more non-transitory computer-readable media that, when executed by the one or more processors, cause the system to perform operations comprising: causing display of a message, representative of an asynchronous meeting, via a user interface of a communication platform, wherein users of the communication platform are associated with the asynchronous meeting, and wherein the user interface includes an affordance to add a snippet of content to the asynchronous meeting; in response to detecting an actuation of the affordance, causing display of an input user interface, wherein the input user interface includes an option to record or upload the snippet of content to add to the asynchronous meeting; receiving the snippet of content from a client of a user associated with the asynchronous meeting; associating the snippet of content with one or more other snippets of content added by one or more other users associated with the asynchronous meeting, wherein the snippet of content and the one or more other snippets of content comprise a collection of snippets of content; and causing a preview summary of one or more snippets of content of the collection of snippets of content to be displayed in association with the message, wherein each snippet of content of the collection of snippets of content is viewable via a thread associated with the message.

I. The system of paragraph H, wherein the asynchronous meeting is associated with a meeting object stored in association with a datastore of the communication platform, and wherein the meeting object is associated with metadata indicating a date and a time of the asynchronous meeting, the operations further comprising causing the display of the message based at least in part on the date and the time.

J. The system of paragraph H or I, wherein the users are associated with two or more organizations.

K. The system of any of claims H-J, wherein the client is a first client of a first user of the users and wherein the snippet of content is a first snippet of content, the operations further comprising: receiving, at a first time and from a second client of a second user of the users, a first request to view at least a second snippet of content of the collection of snippets of content; in response to receiving the first request, causing at least the second snippet of content to be displayed via the second client; receiving, at a second time and from a third client of a third user of the users, a second request to view at least a third snippet of content of the collection of snippets of content; in response to receiving the second request, causing at least the third snippet of content to be displayed via the third client.

L. The system of any of claims H-K, wherein the snippets of content are presented in a thread of the message, and wherein each snippet of content is independently interactable.

M. The system of any of claims H-L, wherein the preview summary comprises one or more tiles representative of the one or more snippets of content.

N. One or more non-transitory computer-readable media that, when executed by one or more processors, cause the one or more processors to perform operations comprising: causing display of a message, representative of an asynchronous meeting, via a user interface of a communication platform, wherein users of the communication platform are associated with the asynchronous meeting, and wherein the user interface includes an affordance to add a snippet of content to the asynchronous meeting; in response to detecting an actuation of the affordance, causing display of an input user interface, wherein the input user interface includes an option to record or upload the snippet of content to add to the asynchronous meeting; receiving the snippet of content from a client of a user associated with the asynchronous meeting; associating the snippet of content with one or more other snippets of content added by one or more other users associated with the asynchronous meeting, wherein the snippet of content and the one or more other snippets of content comprise a collection of snippets of content; and causing a preview summary of one or more snippets of content of the collection of snippets of content to be displayed in association with the message, wherein each snippet of content of the collection of snippets of content is viewable via a thread associated with the message.

O. The one or more non-transitory computer-readable media of paragraph N, wherein the asynchronous meeting is associated with a meeting object stored in association with a datastore of the communication platform, and wherein the meeting object is associated with metadata indicating a date and a time of the asynchronous meeting, the operations further comprising causing the display of the message based at least in part on the date and the time.

P. The one or more non-transitory computer-readable media of paragraph N or O, wherein the users are associated with two or more organizations.

Q. The one or more non-transitory computer-readable media of any of claims N-P, wherein the client is a first client of a first user of the users and wherein the snippet of content is a first snippet of content, the operations further comprising: receiving, at a first time and from a second client of a second user of the users, a first request to view at least a second snippet of content of the collection of snippets of content; in response to receiving the first request, causing at least the second snippet of content to be displayed via the second client; receiving, at a second time and from a third client of a third user of the users, a second request to view at least a third snippet of content of the collection of snippets of content; in response to receiving the second request, causing at least the third snippet of content to be displayed via the third client.

R. The one or more non-transitory computer-readable media of any of claims N-Q, wherein the snippets of content are presented in a thread of the message, and wherein each snippet of content is independently interactable. S. The one or more non-transitory computer-readable media of any of claims N-R, wherein the preview summary comprises one or more tiles representative of the one or more snippets of content.

T. The one or more non-transitory computer-readable media of any of claims N-S, the operations further comprising: tracking interaction data with individual snippets of content of the collection of snippets of content, wherein the interaction data indicates at least one of a number of reactions per snippet of content or a number of times each snippet of content of the collection of snippets of content has been viewed; and causing an indication of the interaction data to be presented via the user interface.

While the paragraphs above are described with respect to one particular implementation, it should be understood that, in the context of this document, the content of the paragraphs above can also be implemented via a method, device, system, a computer-readable medium, and/or another implementation. Additionally, any of paragraphs A-T may be implemented alone or in combination with any other one or more of the paragraphs A-T.

The invention claimed is:

1. A method, implemented by at least one computing device of a communication platform, comprising:
receiving, at a first time, a request to schedule an asynchronous meeting within the communication platform, wherein the request is associated with a condition to initiate the asynchronous meeting with attendees of the asynchronous meeting, the attendees include users of the communication platform;
storing a meeting object associated with a meeting identifier of the asynchronous meeting, wherein the meeting object is associated with metadata and content associated with the asynchronous meeting, wherein the metadata indicates the condition;
causing, at a second time and based at least in part on a determination that the condition is satisfied, display of a message representative of the asynchronous meeting, via a user interface of the communication platform, wherein the meeting object is associated with a thread of the message to receive one or more replies from the attendees, and wherein the user interface includes an affordance to add the one or more replies including one or more of video content or message content to the asynchronous meeting;
upon detecting an actuation of the affordance, causing display of an input user interface, wherein the input user interface includes an option to record or upload the video content or message content to add to the asynchronous meeting;
receiving the video content or message content from a client of an attendee of the attendees, wherein the video content or message content is associated with the thread of the message and the meeting object;
associating the video content or message content with one or more snippets of content added by one or more of the attendees, wherein the video content or message content and the one or more snippets of content comprise a collection of snippets of content associated with the meeting object; and
causing a preview summary of one or more snippets of content of the collection of snippets of content to be displayed in association with the message, wherein the preview summary includes one or more tiles representative of the one or more snippets of content and wherein the one or more tiles include a first tile representative of a first preview of first video content and a second tile representative of a second preview of second video content, the second video content is received after the first video content, wherein an individual snippet of content of the collection of snippets of content is viewable via interaction with the one or more tiles presented within the thread of the message, and wherein interaction with the first tile causes presentation of the first video content and automatic presentation of the second video content after the first video content.

2. The method of claim 1, wherein the meeting object is a data structure stored in a datastore, and wherein the meeting object is associated with the metadata indicating a date and a time of the asynchronous meeting, the method further comprising causing the display of the message based at least in part on the date and the time.

3. The method of claim 1, wherein the users are associated with two or more organizations.

4. The method of claim 1, wherein the client is a first client of a first user of the users and wherein the video content or message content is a first snippet of content, the method further comprising:
receiving, at a third time and from a second client of a second user of the users, a first request to view at least a second snippet of content of the collection of snippets of content;
in response to receiving the first request, causing at least the second snippet of content to be displayed via the second client;
receiving, at a fourth time and from a third client of a third user of the users, a second request to view at least a third snippet of content of the collection of snippets of content; and
in response to receiving the second request, causing at least the third snippet of content to be displayed via the third client.

5. The method of claim 1, wherein associating the video content or message content with the one or more snippets of content includes mapping the video content or message content to the one or more replies within the thread of the message, the one or more snippets of content are presented in the thread of the message, and wherein each snippet of content is independently interactable.

6. The method of claim 1, further comprising:
tracking interaction data with individual snippets of content of the collection of snippets of content, wherein the interaction data indicates at least one of a number of reactions per snippet of content or a number of times each snippet of content of the collection of snippets of content has been viewed; and
causing an indication of the interaction data to be presented via the user interface.

7. The method of claim 1, wherein the one or more tiles representative of the one or more snippets of content include a third tile representative of a third video content and the third video content is received after the second video content, and the third video content automatically plays after the second video content is played.

8. A system comprising:
one or more processors; and
one or more non-transitory computer-readable media that, when executed by the one or more processors, cause the system to perform operations comprising:
receiving, at a first time, a request to schedule an asynchronous meeting within a communication platform, wherein the request is associated with a condition to initiate the asynchronous meeting with attendees of the asynchronous meeting, the attendees include users of the communication platform;
storing a meeting object associated with a meeting identifier of the asynchronous meeting, wherein the meeting object is associated with metadata and content associated with the asynchronous meeting, wherein the metadata indicates the condition;
causing, at a second time and based at least in part on a determination that the condition is satisfied, display of a message representative of the asynchronous meeting, via a user interface of the communication platform, wherein the meeting object is associated with a thread of the message to receive one or more replies from the attendees, and wherein the user interface includes an affordance to add the one or more replies including one or more of video content or message content to the asynchronous meeting;
upon detecting an actuation of the affordance, causing display of an input user interface, wherein the input user interface includes an option to record or upload the video content or message content to add to the asynchronous meeting;
receiving the video content or message content from a client of an attendee of the attendees, wherein the video content or message content is associated with the thread of the message and the meeting object;
associating the video content or message content with one or more snippets of content added by one or more of the attendees, wherein the video content or message content and the one or more snippets of content comprise a collection of snippets of content associated with the meeting object; and
causing a preview summary of one or more snippets of content of the collection of snippets of content to be displayed in association with the message, wherein the preview summary includes one or more tiles representative of the one or more snippets of content and wherein the one or more tiles include a first tile representative of a first preview of first video content and a second tile representative of a second preview of second video content, the second video content is received after the first video content, wherein an individual snippet of content of the collection of snippets of content is viewable via interaction with the one or more tiles presented within the thread of the message, and wherein interaction with the first tile causes presentation of the first video content and automatic presentation of the second video content after the first video content.

9. The system of claim 8, wherein the meeting object stored in association with a datastore of the communication platform, and wherein the meeting object is associated with the metadata indicating a date and a time of the asynchronous meeting, the operations further comprising causing the display of the message based at least in part on the date and the time.

10. The system of claim 8, wherein the users are associated with two or more organizations.

11. The system of claim 8, wherein the client is a first client of a first user of the users and wherein the video content or message content is a first snippet of content, the operations further comprising:
receiving, at a third time and from a second client of a second user of the users, a first request to view at least a second snippet of content of the collection of snippets of content;
in response to receiving the first request, causing at least the second snippet of content to be displayed via the second client;
receiving, at a fourth time and from a third client of a third user of the users, a second request to view at least a third snippet of content of the collection of snippets of content; and
in response to receiving the second request, causing at least the third snippet of content to be displayed via the third client.

12. The system of claim 8, wherein the snippets of content are presented in the thread of the message, and wherein each snippet of content is independently interactable.

13. The system of claim 8, wherein the one or more tiles are independently interactable.

14. One or more non-transitory computer-readable media that, when executed by one or more processors, cause the one or more processors to perform operations comprising:
receiving, at a first time, a request to schedule an asynchronous meeting within a communication platform, wherein the request is associated with a condition to initiate the asynchronous meeting with attendees of the asynchronous meeting, the attendees include users of the communication platform;
storing a meeting object associated with a meeting identifier of the asynchronous meeting, wherein the meeting object is associated with metadata and content associated with the asynchronous meeting, wherein the metadata indicates the condition;
causing, at a second time and based at least in part on a determination that the condition is satisfied, display of a message representative of the asynchronous meeting, via a user interface of the communication platform, wherein the meeting object is associated with a thread of the message to receive one or more replies from the attendees, and wherein the user interface includes an affordance to add the one or more replies including one or more of video content or message content to the asynchronous meeting;
upon detecting an actuation of the affordance, causing display of an input user interface, wherein the input user interface includes an option to record or upload the video content or message content to add to the asynchronous meeting;
receiving the video content or message content from a client of an attendee of the attendees, wherein the video content or message content is associated with the thread of the message and the meeting object;
associating the video content or message content with one or more snippets of content added by one or more of the attendees, wherein the video content or message content and the one or more snippets of content comprise a collection of snippets of content associated with the meeting object; and
causing a preview summary of one or more snippets of content of the collection of snippets of content to be displayed in association with the message, wherein the preview summary includes one or more tiles representative of the one or more snippets of content and wherein the one or more tiles include a first tile representative of a first preview of first video content and a second tile representative of a second preview of second video content, the second video content is received after the first video content, wherein an individual snippet of content of the collection of snippets of content is viewable via interaction with the one or more tiles presented within the thread of the message, and wherein interaction with the first tile causes presentation of the first video content and automatic presentation of the second video content after the first video content.

15. The one or more non-transitory computer-readable media of claim 14, wherein the meeting object is stored in association with a datastore of the communication platform, and wherein the meeting object is associated with the metadata indicating a date and a time of the asynchronous meeting, the operations further comprising causing the display of the message based at least in part on the date and the time.

16. The one or more non-transitory computer-readable media of claim 14, wherein the users are associated with two or more organizations.

17. The one or more non-transitory computer-readable media of claim 14, wherein the client is a first client of a first user of the users and wherein the video content or message content is a first snippet of content, the operations further comprising:
receiving, at a third time and from a second client of a second user of the users, a first request to view at least a second snippet of content of the collection of snippets of content;
in response to receiving the first request, causing at least the second snippet of content to be displayed via the second client;
receiving, at a fourth time and from a third client of a third user of the users, a second request to view at least a third snippet of content of the collection of snippets of content; and
in response to receiving the second request, causing at least the third snippet of content to be displayed via the third client.

18. The one or more non-transitory computer-readable media of claim 14, wherein the snippets of content are presented in the thread of the message, and wherein each snippet of content is independently interactable.

19. The one or more non-transitory computer-readable media of claim 14, wherein the one or more tiles representative of the one or more snippets of content includes a first tile representative of first video content and a second tile representative of second video content.

20. The one or more non-transitory computer-readable media of claim 14, the operations further comprising:
tracking interaction data with individual snippets of content of the collection of snippets of content, wherein the interaction data indicates at least one of a number of reactions per snippet of content or a number of times each snippet of content of the collection of snippets of content has been viewed; and
causing an indication of the interaction data to be presented via the user interface.

* * * * *